(12) United States Patent
Küchel

(10) Patent No.: US 6,717,679 B2
(45) Date of Patent: Apr. 6, 2004

(54) DISPERSIVE NULL-OPTICS FOR ASPHERIC SURFACE AND WAVEFRONT METROLOGY

(75) Inventor: Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/288,217

(22) Filed: Nov. 5, 2002

(65) Prior Publication Data

US 2003/0128368 A1 Jul. 10, 2003

Related U.S. Application Data

(60) Provisional application No. 60/334,785, filed on Nov. 15, 2001.

(51) Int. Cl.⁷ .................................................. G01B 9/02
(52) U.S. Cl. ........................................ 356/513; 356/515
(58) Field of Search ........................... 356/489, 495, 356/512, 513, 515

(56) References Cited

U.S. PATENT DOCUMENTS

| | | | |
|---|---|---|---|
| 4,347,441 A | | 8/1982 | Dil et al. |
| 4,697,927 A | | 10/1987 | Ono |
| 5,004,346 A | | 4/1991 | KuMichael |
| 5,285,142 A | | 2/1994 | Galburt et al. |
| 5,416,586 A | | 5/1995 | Tronolone et al. |
| 5,625,454 A | | 4/1997 | Haung et al. |
| 5,737,079 A | * | 4/1998 | Burge et al. ............. 356/513 |
| 5,844,670 A | | 12/1998 | Morita et al. |
| 6,312,373 B1 | | 11/2001 | Ichihara |
| 6,359,692 B1 | | 3/2002 | de Groot |
| 6,456,382 B2 | * | 9/2002 | Ichihara et al. ........... 356/513 |
| 2001/0028462 A1 | | 10/2001 | Ichihara et al. |

OTHER PUBLICATIONS

Lin, Ding–tin and Wang, Der–Shen, "Profile Measurement Of An Aspheric Cylindrical Surface From Retroreflection", Applied Optics, vol. 30, No. 22 (Aug. 1, 1991), pp. 3200–3204.

Dorband, B., et al., "High Precision Interferometric Measurements of Lens Elements", Fringe 97: Proceedings of the 3rd International Workshop on Automatic Processing of Fringe Patterns held in Bremen, Germany, Sep. 15–17, 1997, pp. 473–480.

V. Greco, et al., "Interferometeric testing of weak aspheric surfaces versus design specifications" Optik, 87, No. 4 (1991), pp. 159–162.

\* cited by examiner

Primary Examiner—Samuel A. Turner
Assistant Examiner—Patrick J Connolly
(74) Attorney, Agent, or Firm—Francis J. Caufield

(57) ABSTRACT

Interferometric method and apparatus for measuring aspheric surfaces and wavefronts by directing a spherical wavefront of known design at a wavelength $\lambda_1$ at a reference sphere with known measured surface properties to generate a first electronic signal containing information about the optical path differences between the reference and measurement wavefronts generated an interferometer and directing an aspherical wavefront of known design at a wavelength $\lambda_2$ at an aspherical surface or wavefront to be tested to generate a second electronic signal containing information about the optical path differences between the reference and measurement wavefronts generated by the interferometer. The first and second electronic signals are analyzed and calculated therefrom are wavefront error maps $W_1=W_1(\lambda_1)$ and $W_2=W_2(\lambda_2)$, both of which contain wavelength dependent known design and measured errors and unknown errors due to the manufacture, material composition of components in the interferometer, and systematic errors. Optical path length errors caused by shape errors in the aspherical surface or wavefront are determined while accounting for substantially all error sources present in the electronic signals to provide for enhanced precision.

36 Claims, 18 Drawing Sheets

INTERFEROGRAM BETWEEN REFERENCE BEAM AND FIG. 3

0.6764 MICRONS AT 0.0000 MM
PEAK TO VALLEY IS 0.0405 WAVES.
FRINGES PER WAVE IS 0.5000.
XTILT = 5.00. YTILT = 0.00.

INTERFEROGRAM BETWEEN REFERENCE BEAM AND FIG. 4

0.4579 MICRONS AT 0.0000 MM
PEAK TO VALLEY IS 0.0689 WAVES.
FRINGES PER WAVE IS 0.5000.
XTILT = 5.00. YTILT = 0.00.

INTERFEROGRAM BETWEEN REFERENCE BEAM AND FIG. 7

0.6764 MICRONS AT 0.0000 MM
PEAK TO VALLEY IS 0.1546 WAVES.
FRINGES PER WAVE IS 0.5000.
XTILT = 5.00. YTILT = 0.00.

INTERFEROGRAM BETWEEN REFERENCE BEAM AND FIG. 8

0.4579 MICRONS AT 0.0000 MM
PEAK TO VALLEY IS 0.1640 WAVES.
FRINGES PER WAVE IS 0.5000.
XTILT = 5.00. YTILT = 0.00.

PSEUDO INTERFEROGRAM WITH DISPLAY SENSITIVITY REDUCED
BY FACTOR OF 10 FOR FIG. 8

0.6764 MICRONS AT 0.0000 MM
PEAK TO VALLEY IS 45.3511 WAVES.
FRINGES PER WAVE IS 0.5000.
XTILT = 20.00.  YTILT = 0.00.

INTEROGRAM BETWEEN REFERENCE BEAM AND FIG. 14

0.4579 MICRONS AT 0.0000 MM
PEAK TO VALLEY IS 0.0494 WAVES.
FRINGES PER WAVE IS 0.5000.
XTILT = 5.00. YTILT = 0.00.

INTERFEROGRAM BETWEEN REFERENCE BEAM AND FIG. 15

0.6764 MICRONS AT 0.0000 MM
PEAK TO VALLEY IS 0.0227 WAVES.
FRINGES PER WAVE IS 0.5000.
XTILT = 5.00. YTILT = 0.00.

DISPERSIVE NULL-OPTICS FOR ASPHERIC SURFACE AND WAVEFRONT METROLOGY

CROSS REFERENCE TO RELATED APPLICATION

This application claims priority from U.S. Provisional Patent Application No. 60/334,785 filed on Nov. 15, 2001 in the name of Michael Küchel for "DISPERSIVE NULL-OPTICS FOR ASPHERIC SURFACE WAVEFRONT METROLOGY" the contents of which are incorporated herein in their entirety by reference.

FIELD OF THE INVENTION

The invention generally relates to the field of interferometry and, more particularly, to the high accuracy measurement of aspherical surfaces and wavefronts.

BACKGROUND OF THE INVENTION

Aspherical surfaces have become increasingly important in modern optical systems because they offer a higher number of parameters to be optimized for enhancing the performance of a system. This can lead to systems with less surfaces, less weight, smaller dimensions and better performance, to mention only a view. Especially in fields where a high number of optical surfaces are not practical, like in astronomical telescopes or for normal incidence reflecting surfaces for the EUV wavelength of 13.6 nm used for lithography tools, it is mandatory to keep the number of surfaces as low as possible. In such cases, there is no choice but use aspherical surfaces. This is especially for the short wavelength and high quality demands placed on the performance of the complete system operating in the EUV-regime where the surface errors of the reflecting surfaces within such a system must be kept below 0.1 nm, and the measuring accuracy and precision for such errors must be even higher to be able to produce the surfaces in a deterministic manner. Also lens surfaces for lenses used in multi-element systems for lithography applications operating at wavelengths of 193 nm and 157 nm are made aspherical to lower the number of elements made of rare and expensive materials. In these cases, the departures from a best fitting sphere can be as large as 1000 $\mu$m or more, and the dimensions of such lens surfaces have increased to nearly 500 mm.

The fundamental element from which optical systems are made is the single lens element. In an optical system, the function of any lens in the system is to modify the wavefront transiting this lens according to the optical design of the whole system. It is well-known that a spherical or plane wave entering such a lens emerges as an aspherical wavefront with a very high departure from the best fitting sphere, depending on the conjugates used in the particular test-configuration. So, even a single lens with either spherical or aspherical surfaces can only be tested if one is able to deal with aspherical wavefronts in a test set-up. And, it is very important to test refracting lenses in transmission because inhomogeneity of the lens material can deteriorate the wavefront even when the surfaces are free of error.

The measurement of aspherical surfaces and wavefronts increases in difficulty when the departures from the best fitting sphere become large. High precision in interferometric measurements is obtainable as the dynamic range of the measurement is made very small. To reach high precision, the wavefront of the reference wavefront, against which the aspherical wavefront is compared, has to be made aspherical as well, to ideally fit the wavefront to be measured completely. This has been done using either refractive systems, so called "null-systems", or diffractive elements, so called "computer generated holograms", which alter a wave of known and measurable shape (spherical or preferably plane wave) when it transits the compensation element to fit the design aspherical surface at the location where it is designed to be placed in the test-set up.

In all these cases, the compensation element must be tested with the same rigor as the test optic to assure that the correct wavefront is delivered for comparison. This is so because the compensation element acts as a physical reference against which the final surface or part is fabricated. Therefore, unaccounted for minute flaws in the reference, while not visible in the test of the part produced with the help of that reference, in reality, will be manufactured into that part. Prominent examples exist where flaws in the reference have shown up only when the produced part failed to function properly. Consequently, It should be obvious that the same difficulties that exist in testing a test optic are also present when testing compensation elements because, again, an aspherical wavefront is produced.

Existing practices employed only indirect test methods. Refractive null-optics, which deliver the wanted wavefront—or alternatively a wavefront which is close to the wanted wavefront usually deliver wavefronts that depart form their design in a well-known manner. Such null-optics are typically made solely of lenses with spherical surfaces whose radii, as well as the shape-errors, are readily measurable in a so called "null system". Also, the refractive index of the lens material, the lens thickness and the air-spacing between the lenses may be measured carefully. The mounting of such a null-system is made with the highest precision, and it is common practice to design and fabricate them as good as possible to be thermally insensitive. However, there still remain uncertainties of the wavefront generated by the system due to temperature inhomogeneities. From actual measurements then, the theoretical wavefront which should be delivered by such a manufactured system is recalculated. When an aspherical surface is tested with the help of such a well defined null-system, the computed errors in the wavefront delivered by the system due to the errors in the individual parts of the null system are taken into account for the final result reported for the aspherical surface.

Whereas the repeatability of modern interferometric measurement methods can be made as high as fractions of a nm, the final uncertainty of the measurement performed with such a null-system is limited to about a value of tens of nm (typically 30 nm to 50 nm) because of the difficulty in knowing and controlling all influences to the level necessary for achieving fractions of nm. One can compute that, for such uncertainty, the mechanical tolerances in the mount would have to be controlled to tens of nm and that, for instance, the cleaning of the surfaces of the lenses, the index of refraction and the homogeneity of the lens material must be known better than it is possible. The homogeneity and the "real" refractive index of the lens material is influenced by polishing and mounting, which also introduce inner tension to the lens. Such small effects are not controllable today, and it is not possible to perform measurements of the refractive index of the final lens.

While the foregoing problems apply to indirect test methods performed with refractive null-systems, diffractive null-systems, which are called computer generated holograms, use a different fabrication technology and therefore have other problems, which will not be described here in detail. Briefly though, the uncertainty in the wavefronts generated by such diffractive null systems is of the same order of magnitude as with the refractive null systems, or even worse. In the most demanding cases, like mirrors for space telescopes or lens surfaces for lithography lens-systems, it is likely that both methods are applied and compared for their results with the refractive systems being principally used and the holograms used as a cross check. Even mechanical measurements are performed on the final produced parts as an additional cross check for the functionality of the compensation system used for interferometric tests.

Given the problems associated with the current state of the art using null compensators for interferometrically testing optics, it is a primary object of the present invention to provide a method and apparatus for high accuracy measurement of aspherical surfaces or aspherical wavefronts, either of the surface of the final optical part or the wavefront of the final optical lens element in transmission.

It is another object of the invention to lower the uncertainty of the Null-systems to an amount which is similar to the repeatability of the measurements and therefore decrease the uncertainty by a factor of roughly two orders of magnitude.

Other objects of the invention will, in part, be obvious and will, in part, appear hereinafter when the following detailed description is read in conjunction with the drawings.

SUMMARY OF THE INVENTION

This invention relates to dispersive interferometric methods and apparatus for providing measurements of aspheric surfaces and wavefronts to enhanced accuracies.

One aspect of the invention comprises a method for measuring aspheric surfaces and wavefronts with the use of an interferometer by directing a spherical wavefront of known design at a wavelength $\lambda_1$ at a reference sphere with known measured surface properties to generate a first electronic signal containing information about the optical path differences between the reference and measurement wavefronts generated by the interferometer and directing an aspherical wavefront of known design at a wavelength $\lambda_2$ at an aspherical surface or wavefront to be tested to generate a second electronic signal containing information about the optical path differences between the reference and measurement wavefronts generated by the interferometer. The first and second electronic signals are analyzed and calculated therefrom are wavefront error maps $W_1=W_1(\lambda_1)$ and $W_2=W_2(\lambda_2)$, both of which contain wavelength dependent known design and measured errors and unknown errors due to the manufacture, material composition of components in the interferometer, and systematic errors. Optical path length errors caused by shape errors in the aspherical surface or wavefront are determined while accounting for substantially all error sources present in the electronic signals.

In another aspect of the invention, interferometric apparatus is provided for measuring aspheric surfaces and wavefronts and comprises an interferometer having reference and measurement legs and means positioned along said measurement leg for providing a support for alternately holding a reference sphere and an aspheric surface or means for generating an aspheric wavefront. Means for directing a spherical wavefront of known design at a wavelength $\lambda_1$ at a reference sphere with known measured surface properties are included to generate a first electronic signal containing information about the optical path differences between the reference and measurement wavefronts generated by the interferometer and for directing an aspherical wavefront of known design at a wavelength $\lambda_2$ at an aspherical surface or wavefront to be tested to generate a second electronic signal containing information about the optical path differences between the reference and measurement wavefronts generated by the interferometer. Means for analyzing the first and second electronic signals are provided and calculating therefrom wavefront error maps $W_1=W_1(\lambda_1)$ and $W_2=W_2(\lambda_2)$, both of which contain wavelength dependent known design and measured errors and unknown errors due to the manufacture, material composition of components in the interferometer, and systematic errors and determining the optical path error caused by shape errors in the aspherical surface or wavefront while accounting for substantially all error sources present in the electronic signals.

A single compensation lens is used in the interferometer to generate the both the spherical and aspherical wavefronts and $\lambda_1$ and $\lambda_2$, respectively. By accounting for substantially all of the sources of error, precision of a fraction of a nanometer are possible.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION OF THE INVENTION

This invention relates to interferometric apparatus and associated methodology for providing measurements of aspheric surfaces and wavefronts to accuracies that are believed to be one to two orders of magnitude better than those currently available. The invention will be described by first illustrating and discussing a simplified embodiment and its mode of operation. Various error sources will then be identified and mathematically manipulated to produce relationships by which the error sources may be measured and/or calculated and then compensated for in final determinations of measured aspheric surfaces and/or wavefront shapes. Finally more elaborate embodiments will be taken up.

Figure 1A:
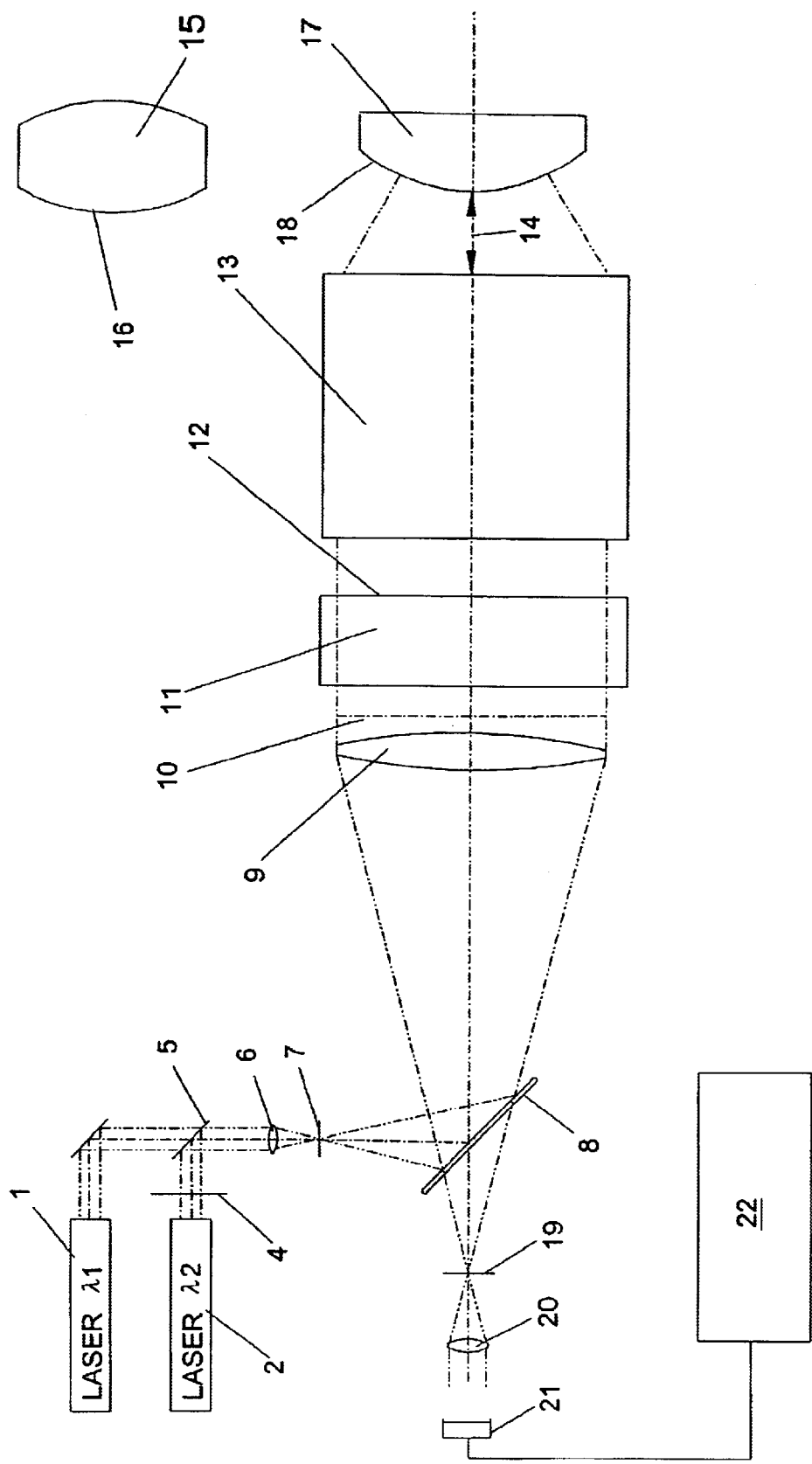
FIG. 1a is a diagrammatic elevational view of an interferometric test arrangement for providing high precision measurements of an aspheric surface with the arrangement shown in a calibration configuration.
Figure 1B:
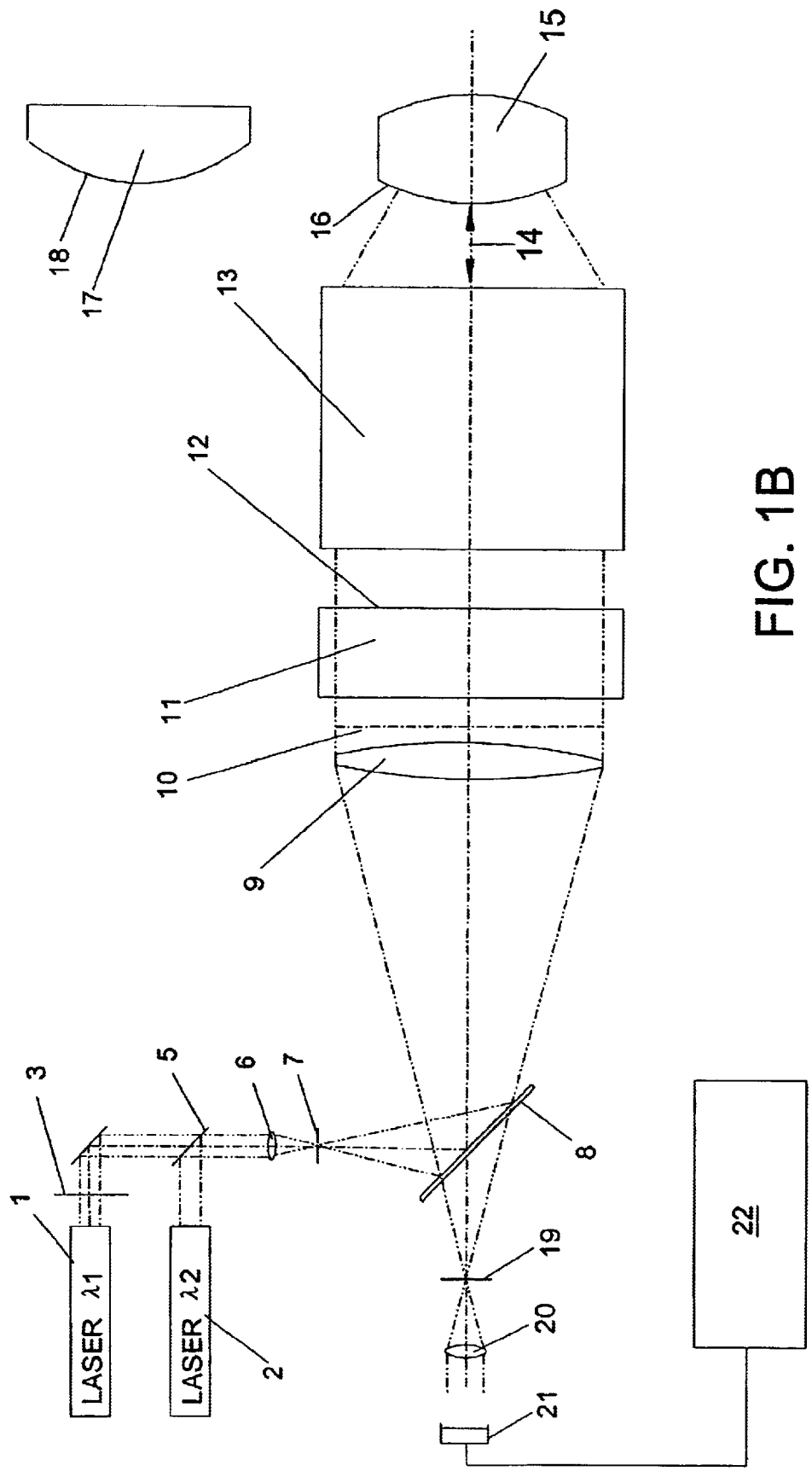
FIG. 1b is a diagrammatic elevational view of the interferometric test arrangement of FIG. 1a shown in a measurement configuration.
Figure 2:
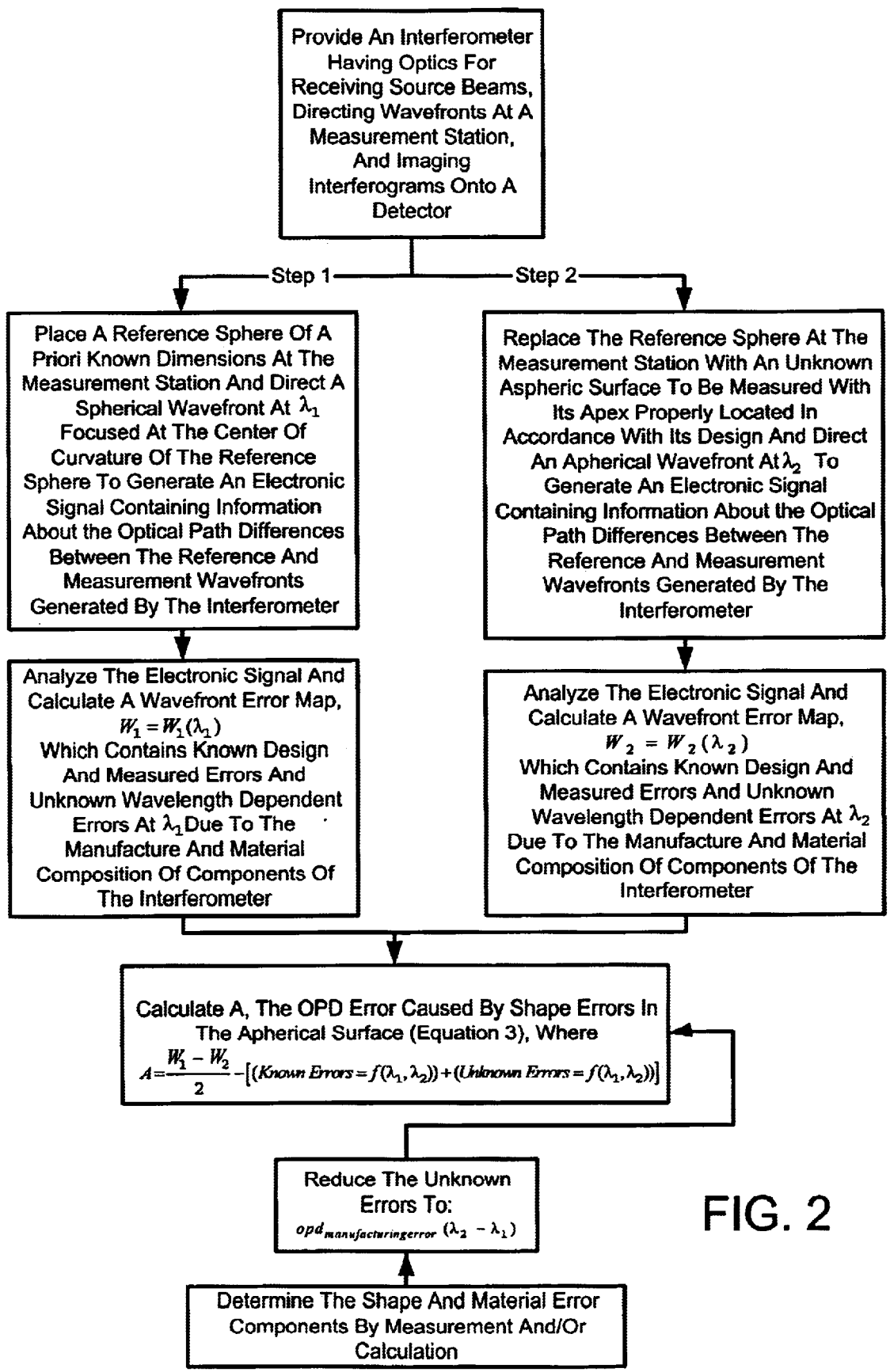
FIG. 2 is a flow chart illustrating certain steps carried out in practicing the invention illustrated in FIGS. 1a and 1b.

Reference is now made to FIGS. 1a and 1b which show a test set-up that can be used in a two step process to perform high precision measurements of aspherical surfaces such as that at 16 according to the teachings of the invention. The process is a combination of the two steps where the first step is a "calibration step" (FIG. 1a) and the second step is a "measurement step" FIG. 1b). It is a characteristic of the invention that the two steps utilize different wavelengths of one light source or different light sources with different wavelengths. The steps can either be performed in a sequence or, in any other variation of the set up (e.g., simultaneously). However, the description to follow assumes sequential steps, but the order of the steps is not of importance for the final result.

In FIGS. 1a and 1b, two lasers 1 and 2 are shown, which emit at wavelengths $\lambda_1$ and $\lambda_2$, respectively. Lasers 1 and 2 can be actuated one after the other, with the help of shutters 3 and 4. Both beams of the lasers are brought together by the help of a—preferably dichroic—beamsplitter 5 or alternatively with the help of a prism (not shown in FIG. 1a or 1b). The beams are then focused to a small spot with the help of lens 6, which is color-corrected for both wavelengths, and cleaned by a small pinhole 7. The pinhole 7 is located in the focal plane of a collimator lens 9, which is corrected for spherical aberration and change in focal length with color for both wavelength, i.e. it is an Achromat. As is well-known, this is achieved by the use of at least two lens elements made from different optical glass. The figures show only a diagrammatic view of the elements. Another well-known possibility is to use reflective optics, which are well-known to be achromatic in principle. The collimator lens 9 is configured to produce plane wavefronts 10 for both wavelengths, which are incident to a plane-plate 11, having at its back side a very high quality plane surface 12. This element is called a "transmission flat".

In a first step when the wavelength $\lambda_1$ is used, the plane wavefront 10 transiting transmission flat 11 enters a null-system 13, which appears in the figures only very diagrammatically as a "box" for present purposes, not showing the details of the optical lay-out. This lay-out depends on the exact functionality of the lens for a given task and can differ from case to case considerably. In the first example described here, the specific optical lay out is chosen so that lens system 13 produces a wavefront, which is close to a spherical wave (nominally spherical, with deviations small enough to be measured with high accuracy (note that this can still be several "fringes", i.e. the deviation in the interferogram can be as large as several wavelengths!). The actual deviations of the spherical wavefront from it's theoretical design value, which is produced by the real manufactured system 13, can be tested with very low uncertainty with the help of a spherical artifact or reference 17, which has a surface 18 of known deviations from an ideal sphere. The reason for the low uncertainty in this step is because there exist so-called "absolute" methods for the test of spherical surfaces, which are well-known to those skilled in the art and which will not be repeated here. These methods deliver an uncertainty which is comparable to the repeatability of the measurements, which is on the order of fractions of nm in the best cases today. So, it can be assumed that a very accurate error map is available for the surface 18 of the spherical artifact 17.

Another quantity which equally influences the result of this first calibration measurement is the shape of the plane surface 12, which delivers the reference wavefront in the Fizeau cavity. A plane surface can also be measured with very low uncertainty, so a similar argument applies for the plane surface 12 as in the case of the spherical surface 18. But, transmission flat 12 is common to both measurements (see FIGS. 1a and 1b), so its influence on the final result is somewhat different from that of surface 18.

The light reflected by the surface 18 serves as a reference wavefront, and the light transmitted by the surface 12, transmitted by the system 13, reflected by the surface 18 and again transmitted by the system 13 acts as the measurement wavefront. Both wavefronts travel back through the collimator lens 9 and a beamsplitter 8 after which they pass through an aperture 19. A lens 20 images the surface 18 onto a CCD detector 21, where an interferogram can now be seen.

With proper phase-measurement techniques, which are well-known to those knowledgeable in the art and which are therefore not described here, the optical path difference between the interfering wavefronts are measured and transferred to the computer 22. As will be understood, computer 22 is also programmed in a well-known manner to handle, computational, logical, operational and housekeeping tasks.

The wavefront-error map $W_1$, which is measured in this first step, is expressed in units of length (preferably in nm) and shows the spatial distribution (using, for instance, the x,y-coordinate system of the CCD-camera) of the optical path difference variations between the two surfaces defining the interferometer cavity. The dependence of the spatial coordinates are suppressed in the following for the sake of simplicity. This wavefront-error map $W_1$ contains the following components, which are explained later:

$$W_1 = 2 \cdot F + 2 \cdot OPD_{design}(\lambda_1) + 2 \cdot OPD_{manufacuringerror}(\lambda_1) + 2 \cdot S + M_1 \quad (1)$$

After the above measurement, the light-source is changed to the wavelength $\lambda_2$ with the help of a set of shutters 3 and 4, and the spherical artifact 17 is replaced by a lens 15 which contains a aspherical surface 16 to be measured. The air-spacing 14 between the last vertex of the lens in system 13 (not shown) and the vertex of the aspherical surface is very critical and must be accurately set to the correct distance.

According to the invention, the design of the compensation system is done such that a wavefront is generated that matches the aspherical surface 16 at the distance 14 very closely, but not necessarily perfectly. The design of the compensation system can be judged as successful when an interferogram results that is capable of being measured with high precision. This is generally the case, when the wave-front deviation is on the order of some wavelength, $\lambda$.

Therefore, for the second step, the measured wavefront—error map $W_2$ contains the following parts:

$$W_2 = 2 \cdot F + 2 \cdot OPD_{design}(\lambda_2) + 2 \cdot OPD_{manufacuringerror}(\lambda_2) + 2 \cdot A + M_2 \quad (2)$$

The components in Equations (1) and (2) are:

F OPD caused by the surface-height errors of the transmission flat 12

$OPD_{design}(\lambda)$ OPD caused by the system 13 with the use of wavelength $\lambda$ from an ideal target-value for wavelength $\lambda$ $OPD_{design}(\lambda_1)$ OPD-error from the ideal design target caused by the system 13 with the use of wavelength $\lambda_1$. Note: the target for step 1 is a spherical wavefront, so $OPD_{design}(\lambda_1)$ describes the deviation of the design from that target.

$OPD_{design}(\lambda_2)$ OPD-error from the ideal design target caused by the system 13 with the use of wavelength $\lambda_2$. Note: the target for step 2 is the aspherical wavefront equal to the aspherical surface to be tested, so $OPD_{design}(\lambda_2)$ describes the deviation of the design from that ideal target.

$OPD_{manufacturingerror}(\lambda)$ OPD-error caused by the system when used with wavelength $\lambda$ due to manufacturing errors of the system. This includes errors due to shape-errors of the individual lens surfaces, errors in the radii of lenses, thickness of lenses and air-spacing between the lenses, homogeneity of the optical glass, refractive index of the optical glass including the influence of the actual temperature from its design temperature, errors in the dispersion of the optical glass, and other errors.

$OPD_{manufacturingerror}(\lambda_1)$ OPD-error caused by the system when wavelength $\lambda_1$ is used.

$OPD_{manufacturingerror}(\lambda_2)$ OPD-error caused by the system when wavelength $\lambda_2$ is used.

S OPD-error caused by the (known) errors of the deviation of the spherical artifact used in step 1.

A OPD-error caused by the shape-errors in the aspherical surface.

$M_1, M_2$ OPD-errors in measurements of step 1 and step 2 of random nature; this error source has no bias, i.e. an statistical expectation value of zero. It is mentioned here only for completeness. The smaller the values are, the better the repeatability of the process will be. In some cases, also included might be drift errors between the two step process, if it is performed sequentially.

The goal is to measure A; therefore, Equations (1) and (2) are solved for A. The result is:

$$A = \frac{W_2 - W_1}{2} - [OPD_{design}(\lambda_2) - OPD_{design}(\lambda_1)] + S - \quad (3)$$
$$[OPD_{manufacturingerror}(\lambda_2) - OPD_{manufacturingerror}(\lambda_1)] -$$
$$\frac{1}{2}(M_2 - M_1)$$

As can be seen from Equation (3), two different types of errors influence the final result for the shape-errors, A of the aspheric surface: well-defined and known parts and not so well-defined, or unknown parts.

These errors will be now discussed in detail. The first three quantities are well-known:

$$\frac{W_2 - W_1}{2}$$

is the idealized, expected measurement result, not containing the random measurement errors. The quantity is known by measurement, and the uncertainty for the value is very small, since only very small sources of other errors, systematical in nature, might be present. It is judged that the uncertainty of that quantity can be made smaller than 0.05 nm peak to valley in a well designed instrument.

$[OPD_{design}(\lambda_2) - OPD_{design}(\lambda_1)]$ is known from the design of the system 13. Modern ray-tracing programs like ZEMAX deliver computation precision of better than 0.05 nm peak to valley.

S is the result of a calibration measurement of the spherical artifact; very well designed and carried out procedures may leave uncertainties in the order of magnitude of 0.05 nm peak to valley.

The third quantity is $[OPD_{manufacturingerror}(\lambda_2) - OPD_{manufacturingerror}(\lambda_1)]$, which has to be analyzed. Going back to measurement step 1, Equation (1) is solved for $OPD_{manufacturingerror}(\lambda_1)$:

$$OPD_{manufacturingerror}(\lambda_1) = \frac{W_1}{2} - OPD_{design}(\lambda_1) - S - F - \frac{M_1}{2} \quad (4)$$

Neglecting $M_1$, and under the assumption that S and F are known from measurements as stated before, $OPD_{manufacturingerror}(\lambda_1)$ is computed.

Because of the technique of the invention, a means to measure the "quality" of the manufacturing process of a null-system is given for the first time, and the result can be improved by further working on the parts in order to make $OPD_{manufacuringerror}(\lambda_1)$ as small as possible. One very good possibility is to retouch the figure of one lens surface to cancel the wavefront-errors of the complete, mounted system by proper corrections applied to that one surface. Thus, errors which originally came from other lens surfaces or stem from inhomogeneity of the lens material can be compensated, at least to a very large extend.

For the following discussion, the Optical Path Difference errors induced by manufacturing errors is further broken down into parts, in the sense of a power series expansion (Taylor series):

$$OPD_{manufacturingerror}(\lambda + \Delta\lambda) \approx \qquad (5)$$
$$OPD_{manufacturingerror}(\lambda) + \frac{\partial}{\partial\lambda}OPD_{manufacturingerror}(\lambda) \cdot \Delta\lambda + \ldots$$

$$OPD_{manufacturingerror}(\lambda_2) = OPD_{manufacturingerror}(\lambda_1) + \qquad (6)$$
$$\frac{\partial}{\partial\lambda}OPD_{manufacturingerror}(\lambda_1) \cdot (\lambda_2 - \lambda_1) + \ldots =$$
$$OPD_{manufacturingerror}(\lambda_1) + opd_{manufacturingerror}(\lambda_1) \cdot (\lambda_2 - \lambda_1) + \ldots$$

In Eq. (6), the complete error is broken down into a part which is known from Eq. (4) and a part, which describes the change of the manufacturing errors with wavelength (this part has the dimension nm/nm and is multiplied with the difference of the wavelengths used, i.e., it is dimensionless) and is abbreviated as $opd_{manufacturingerror}$. An aspect of the invention is based on the fact that this second part is much smaller than the first part when multiplied with $(\lambda_2-\lambda_1)$. It is believed that this part may be a factor of 30 to 100 times smaller than the first part. This statement will be made plausible later.

When Eq. (6) is inserted into Eq. (3), the bracket $\lfloor OPD_{manufacturingerror}(\lambda_2)-OPD_{manufacturingerror}(\lambda_1) \rfloor$ reduces to $opd_{manufacturingerror}(\lambda_2-\lambda_1)$. This important result taken together with the statistical measurement uncertainties $(M_1-M_2)/2$ are now the main sources of error for the measurement of the aspherical surface A. As already mentioned, this is an improvement by one or two orders of magnitude compared to the state of the art. As will be shown, it is possible to deduce the greatest part of the $opd_{manufacturingerror}$ thus reducing the uncertainty forever.

Before some explicit examples and discussions of some useful variations of the principle are taken up, the statement that the main part of the OPD-errors induced by the manufacturing process are independent of the wavelength, and that only a very small section of the OPD-errors will change with the wavelength, i.e. are of "chromatic" nature, will be discussed. Moreover, it will also be shown that from this small fraction, which is wavelength dependent, the greatest fraction can be compensated mathematically, so that only a very small part of, maybe 1%, of the total errors in the compensation system caused by imperfections in the manufacturing process must be included in the uncertainty of the measurements.

The first principle is, that the errors are small, so that the assumption of a linear superposition of the effects is an adequate approach. Second, the errors in the optical path difference are dealt with, i.e., with the dimension of length, and these can be of positive and negative sign and are independent of the wavelength used (i.e., the dimension are not "fringes" or "phases").

The errors can be thought of as being in categories:
1. errors in the shape of the surfaces separating two different media of refraction (i.e., glass and air): these types of errors will be called $OPD1_{manufacturingerror}$
2. inhomogeneity errors for the index of refraction for the lens material (for whatever reason); these types of errors will be called $OPD2_{manufacturingerror}$ Both error types can be studied equally well on a single "plane parallel plate", which have the property that the $\lfloor OPD_{design}(\lambda_2)-OPD_{design}(\lambda_1) \rfloor$ is zero for that case, and therefore does not interfere with the premises.

First consider case 1, then go to case 2.

Case 1: Surface Errors on the Lenses

If it is assumed for case 1 that a surface defect at one surface is a "step" of height h, and insist that the OPD is induced by that step, the result is given by the well-known equation:

$$OPD1_{manufacturingerror}(\lambda)=(n(\lambda)-1) \cdot h \qquad (7)$$

From that, h can be computed:

$$h = \frac{OPD1_{manufacturingerror}(\lambda)}{n(\lambda) - 1} \qquad (8)$$

The color induced change of the OPD is simply:

$$\Delta OPD1_{manufacturingerror}OPD1_{manufacturingerror}(\lambda_2)-$$
$$OPD1_{manufacturingerror}(\lambda_1)=(n(\lambda_2)-n(\lambda_1)) \cdot h \qquad (9)$$

If it is assumed that $OPD1_{manufacturingerror}(\lambda_1)$ can be measured, because in the case of $\lambda_1$, no aspherical wavefront is involved (see Equation (4)). Therefore substituting for h:

$$\Delta OPD1_{manufacturingerror} = (n(\lambda_2)-n(\lambda_1))\frac{OPD1_{manufacturingerror}(\lambda_1)}{n(\lambda_1)-1} = \qquad (10)$$
$$\frac{n(\lambda_2)-n(\lambda_1)}{n(\lambda_1)-1}OPD1_{manufacturingerror}(\lambda_1)$$

Therefore, measuring the OPD for one of the wavelengths and knowing the refractive indices of the glass used for the two wavelengths, allows for the exact calculation of the color induced part $\Delta OPD1_{manufacturingerror}$ of the $OPD1_{manufacturingerror}$. If this part is known, it can be introduced explicitly into the Equation (3) and A can be calculated with an uncertainty which is now nearly as small as the repeatability of two measurements.

If no such attempt is done to explicitly compensate the known $OPD1_{manufacturingerror}$, from Equation (10) it can be computed which fraction of the manufacturing errors, due to surface figure errors, might be the color dependent part, which is not "automatically" canceled by the method proposed in the invention. Therefore, a quantity Fraction_surface is defined, which is:

$$\text{Fraction\_surface} = \frac{n(\lambda_2)-n(\lambda_1)}{n(\lambda_1)-1} \qquad (11)$$

and $$\Delta OPD1_{manufacturingerror}=\text{Fraction\_}$$
$$\text{surface} \cdot OPD1_{manufacturingerror}(\lambda_1) \qquad (12)$$

To compute the color induced change in the $\Delta OPD1_{manufacturingerror}$ knowing $OPD1_{manufacturingerror}$ itself, this Fraction_surface must be computed. To judge the quantitative aspect of (11), consider an example at the two wavelengths:

$\lambda_1$=457.94 nm $Ar^+$ Laser line with typically 300 mW power, if all lines have a power of 4W $\lambda_2$=676.44 nm $Kr^+$ Laser line with typically 120 mW power, if all lines have a power of 2W The refractive indices for several glasses from the Schott catalog are given below for those two wavelengths:

TABLE 1

| | $n(\lambda_1)$ ($\lambda_1$ = 457.94 nm) | $n(\lambda_2)$ ($\lambda_2$ = 676.44 nm) | $\Delta n = n(\lambda_1) - n(\lambda_2)$ | Fraction_surface | Fraction_ homogeneity |
|---|---|---|---|---|---|
| SF2 | 1.6669869703 | 1.6407789820 | −0.026208 | −0.0409 | −0.01597 |
| SFL57 | 1.8835410324 | 1.8340522437 | −0.049489 | −0.0593 | −0.02698 |
| SK11 | 1.5728843736 | 1.5603243858 | −0.012560 | −0.0224 | −0.00805 |
| KF9 | 1.5334288516 | 1.5196137816 | −0.013815 | −0.0266 | −0.00909 |
| SF59 | 2.0009386371 | 1.9362147328 | −0.064724 | −0.0691 | −0.03343 |
| F7 | 1.6430617195 | 1.6189931561 | −0.024069 | −0.0389 | −0.01487 |

Case 2: Inhomogeneity in the Glass

For this error type, assume again a plane parallel plate, now with a specific thickness of d and made of glass with an index of refraction of n in one region and n+Δn in another region. The OPD-error induced by that is:

$$OPD(\lambda) = \Delta n(\lambda) \cdot d \quad (13)$$

The assumption which is made here is that the inhomogeneity depends on the wavelength in the same manner as the index of refraction depends on the wavelength. This assumption is not "proven" in a strict sense, but seems to be the most plausible assumption which could be made.

Again the change of the OPD is of interest when switching from wavelength $\lambda_1$ to wavelength $\lambda_2$. Again, the question is whether it is possible to deduce $OPD2_{manufacturingerror}(\lambda_2)$ when $OPD2_{manufacturingerror}(\lambda_1)$ is known. Writing down Eq. (12) for both wavelengths, the result is:

$$OPD2_{manufacturingerror}(\lambda_1) = \Delta n(\lambda_1) \cdot d \quad (14)$$

$$OPD2_{manufacturingerror}(\lambda_2) = \Delta n(\lambda_2) \cdot d \quad (15)$$

For a specific compensation system there are a number of lenses with a certain "geometrical path length d" for each ray within the optical glass. This path length is different for every ray, but not significantly different when the wavelength is switched from $\lambda_1$ to $\lambda_2$. So, eliminating d out of the two equations, the result for $OPD2_{manufacturingerror}(\lambda_2)$ is:

$$OPD2_{manufacturingerror}(\lambda_2) = \frac{\Delta n(\lambda_2)}{\Delta n(\lambda_1)} \cdot OPD2_{manufacturingerror}(\lambda_1) \quad (16)$$

and for the wavelength induced (chromatic) difference of the OPDs:

$$\Delta OPD2_{manufacturingerror} = \quad (17)$$

$$OPD2_{manufacturingerror}(\lambda_2) - OPD2_{manufacturingerror}(\lambda_1) =$$

$$\left(\frac{\Delta n(\lambda_2)}{\Delta n(\lambda_1)} - 1\right) \cdot OPD2_{manufacturingerror}(\lambda_1) =$$

$$\left(\frac{n(\lambda_2)}{n(\lambda_1)} - 1\right) \cdot OPD2_{manufacturingerror}(\lambda_1) =$$

$$\text{Fraction\_homogeneity } OPD2_{manufacturingerror}(\lambda_1)$$

with:

$$\text{Fraction\_homogeneity} = \frac{n(\lambda_2) - n(\lambda_1)}{n(\lambda_1)} \quad (18)$$

Values for (18) are also given in Table 1.

Final Correction for the Sum of Both Error Types

Taking together the statements made in Equations (12) and (17), the wavelength dependent part of the manufacturing induced errors is $\Delta OPD_{manufacturingerror}$ expressed as a fraction of the measured, manufacturing induced errors $OPD_{manufacturingerror}(\lambda_1)$ of the compensation system used with wavelength $\lambda_1$:

$$\Delta OPD_{manufacturingerror} = \text{Fraction\_surface} \cdot OPD1_{manufacturingerror}(\lambda_1) + \text{Fraction\_homogeneity} \cdot OPD2_{manufacturingerror}(\lambda_1) \quad (19)$$

To apply this equation now to a given compensation system, two difficulties arise:

1.) for the different lens materials, the values for the two different "Fractions" are different, 2.) from the measurement with wavelength $\lambda_1$ according to Equation (4) only the sum $OPD1_{manufacturingerror}(\lambda_1) + OPD2_{manufacturingerror}(\lambda_1)$ of the two error components is known, but not the separation between the components.

So some "approximation" is made to solve these two problems. It would be helpful for the approximation, if the manufacturing capabilities of the optical shop are known, measuring the figures of all lens surfaces individually and noticing the orientation. And finally adding all the error maps in the correct orientation, before applying the appropriate factors of $(n(\lambda_1)-1)$ to the individual surface error maps. Neglecting random measurement noise, the resulting sum should in principle be smaller then the measured value for $OPD_{manufacturingerror}(\lambda_1)$ because of additional alignment and spacing errors of the individual lenses, which can be substituted under "surface shape errors", i.e. type 1 errors, and in addition, giving room for the second part within the total error, which is due to inhomogeneities due to material imperfections and stress. If such exercises are done carefully and with insight into the different stages of the complete production and mounting process, there should be a sense of the separation of the errors into its two parts. Even allowing for some error in this "approximation", it is still worth while to do the exercise carefully, in order to reach the lowest uncertainty for the final measurement result for the asphere.

After separating the total measured OPD error with wavelength $\lambda_1$ into the two components $OPD1_{manufacturingerror}(\lambda_1)$ and $OPD2_{manufacturingerror}(\lambda_1)$, the values for Fraction_ surface and Fraction_homogeneity should be decided upon and applied when several individual lenses are used in the compensation system. The mathematical correction should take into account the lens surfaces and inhomogeneities for all the lenses made from different material, and should be a weighted sum of the influences of the individual lenses. The easiest assumption would be that all lenses have similar shares of the total error, and therefore the Fraction_surface and Fraction_homogeneity could simply be the average value computed from the individual index of refractions for both wavelengths (see Table 1).

It is reasonably assumed that the errors associated with the separation of the total measured error into two categories and the somewhat arbitrary assumption of equal influences of all the surfaces, might not be greater than 20% of the values for the Fraction_suface or Fraction_homogeneity used. Therefore, the total error after "best guess correction" might be in the order of 1 part in 100 to 1 part in 200 of the measured error for the compensation system (i.e., 20% of Fraction_surface or of Fraction_homogeneity).

Even if the measured error is taken into account, refining the compensation system to the very limit will still further reduce the total error left. It is assumed that the null system can be manufactured to an $OPD_{manufacturingerror}(\lambda_1)$ of 10 nm PV with no major difficulties. If zero random errors are assumed in the measurements of $OPD_{manufacturingerror}(\lambda_2)$ for a moment, the final uncertainty in the wavefront produced with the compensation system with wavelength $\lambda_2$ after "best guess" correction might be in the order of 0.08 nm PV, which is about 0.02 nm RMS. This value is adequate for the most demanding task today.

EXAMPLES OF CALCULATED SYSTEMS

Following are three examples of calculated compensation-systems, which are given here with their optical specifications. In all three cases, the compensation-systems provide as the two wavefronts a spherical wave with $\lambda_1$ and a pure parabolic wavefront with $\lambda_2$. The reason for choosing a pure parabola was so it could be demonstrated in general way, that a specific "asphere" can be made the target for the design. To explain this, consider the mathematical presentation of aspheric wavefronts. An aspheric surface or an aspheric wavefront is generally defined by the following equation:

$$z(r) = \frac{c \cdot r^2}{1 + \sqrt{1-(1+k)c^2 r^2}} + a_2 r^2 + a_4 r^4 + a_6 r^6 + \cdots + a_n r^n \quad (20)$$

$c=1/R_0$ $R_0$ is the radius of the best fitting sphere in the apex  (21)

z(r) the sag of the surface in axial direction
r is the lateral coordinate on the surface
k is the conic constant, with
k=0 for a sphere
k=−1 for a parabola
$a_2, a_4, \ldots a_n$ coefficients defining higher order If an optical system which contains lenses made of glass is designed such that, for instance, a plane wavefront enters the entrance pupil and a (nearly) pure spherical wavefront leaves the exit pupil, when light of wavelength $\lambda_1$ is used, then this wavefront can be described with the help of Equation (20), but with the special feature, that k=0 and all coefficients $a_2$ to $a_n$ are zero (or, strictly spoken, very close to zero). Now exposing the system with a different wavelength, any other wavefront than the design wavefront for the same system leaving the exit pupil can be described with the help of all the coefficients $a_2$ to $a_n$, i.e., no "specific" design target is met with this system. Rather than this, the system acts in its very "natural" manner producing one of the billions of billions of different possible aspherical wavefronts, and due to the well known "Gauss error", a term which is used by the optical designers to describe the behavior of optical systems to change their spherical aberration when the wavelength is changed, the wavefront leaving the exit pupil can be described with ever changing new (but for a given system well defined) sets of coefficients $a_2$ to $a_n$, when new wavelength $\lambda_1$ are used. It will never appear by chance that for one wavelength a wavefront will result, which can be described by purely the use of the conic constant, i.e., that all coefficients $a_2$ to $a_n$ will become very small numbers (close to zero) all at the same time. The behavior of a system to deliver wavefronts for a pair of given wavelengths $\lambda_1$ and $\lambda_2$ (known laser lines), which can be described without using the coefficients $a_2$ to $a_n$ for both cases, is truly something specific, and it must therefore be proven by examples that this is possible. As can be seen from the examples described in this invention, it is possible specifying the design target in a modern optical ray-tracing and optimization program such as ZEMAX, which was used for this examples. In these cases, k=0 and k=−1 have been chosen as the target conic constants for the two wavelengths with $a_2$ to $a_n$ being zero in both cases. From this discussion, it will be clear to one skilled in the art, that this is by no means a restriction of the invention to a "special case". On the contrary, having proven that it is possible to reach the goal of k=0 and k=−1 by changing the wavelength from $\lambda_1$ to $\lambda_2$, it is implicitly also proven that a given specific set of coefficients $a_2$ to $a_n$ could be reached, if this is set as the design goal. These coefficients describe a very well defined, specific wavefront, and the same is true for a pure parabola.

Three examples, all using the same two wavelengths, are now presented. The first example illustrates what was described in order to most clearly describe the idea of the invention, which is the two step procedure of calibrating the compensation system with $\lambda_1$ and with the help of a spherical mirror, and then using it with $\lambda_2$ in order to produce the wanted aspherical wavefront.

In the second example, it is shown that these two steps can be performed simultaneously; this has the extra benefit that all error sources which can be sub summarized with "drift effects" are automatically canceled. This is especially important because the index of refraction of some optical glasses have a strong temperature dependence, and because the compensation system is used within the interferometer cavity. This effect influences the final result in the case of a sequential two step process. In fact, this drift effect was not explicitly described by the equations presented before and must be understood as being implicitly a part of the measurement errors in M1 and M2.

The third example is given for completeness. Here, the compensation system contains as its last lens surface an aspherical surface. Thus, this compensation system can be used as a "transmission asphere" (contrary to the more common "transmission spheres"), i.e., it combines the functionality of a Fizeau surface against an aspherical surface tested in a pure Fizeau test configuration. Also, the compensation system correctly "illuminates" the last aspherical Fizeau surface. Such a system and its use and benefits are described in the U.S. Provisional Patent Application No. 60/299,512 titled "APPARATUS AND METHOD FOR MEASURING ASPHERICAL OPTICAL SURFACES AND WAVEFRONTS" filed on Jun. 20, 2001, now U.S. patent application Ser. No. 10/152,075 filed on May 21, 2002 and published on Jul. 10, 2003 as publication number US-2003-0002048, the entire contents of which are incorporated herein by reference. In this third example, it is shown that such a system can be tested with the help of a spherical mirror, using the other design wavelength.

Example 1

Example one shows a two lens system, the lenses being made of the SCHOTT glass SFL57 and SF2. The system is designed for the use of the wavelength $\lambda_1$=676.44 nm, which is an Kr-Laser wavelength and $\lambda_2$=457.94 nm, which is an Ar-Laser wavelength. A plane wavefront with a diameter of 100 mm enters the system. The system is capable of producing two different, specific wavefronts for both cases:

With $\lambda_1=676.44$ nm, a spherical wave is produced at a distance of 88.04383 mm from the last surface (Conic constant is 0), and With $\lambda_2=457.94$ nm, a parabolic wave is produced at a distance of 165.1649 mm from the last surface (Conic constant −1).

Figure 3:
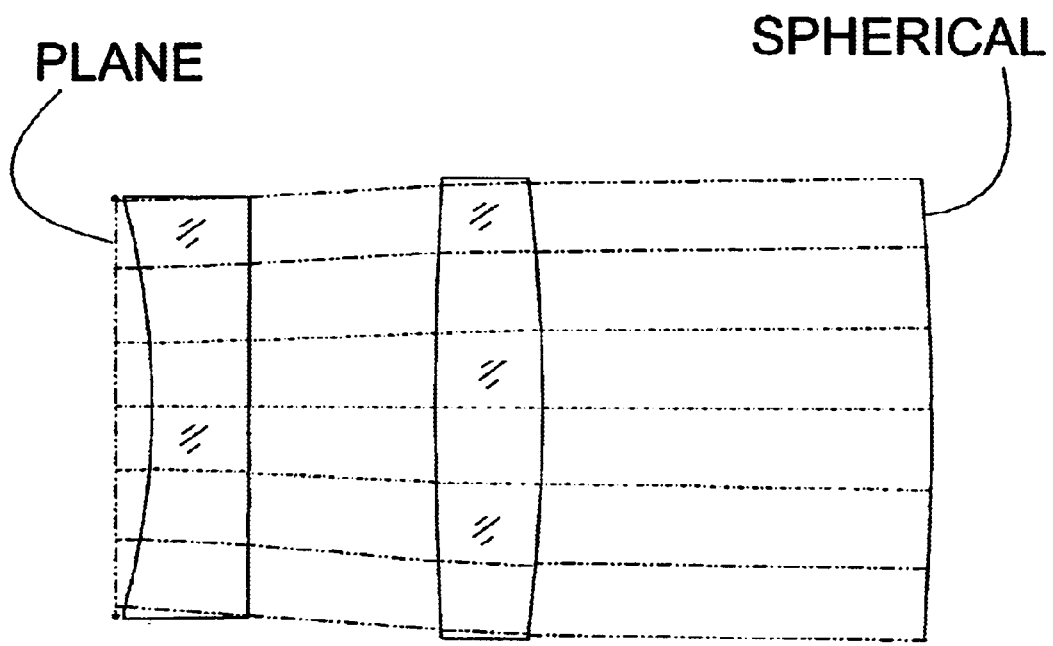
FIG. 3 is a diagrammatic elevational view of a compensation system used with wavelength $\lambda_1$=676.44 nm for producing a spherical wavefront with a diameter of 129.8 mm at a distance of 88.04383 mm from the last lens surface with a plane wavefront of diameter 100 mm entering from the left side.
Figure 4:
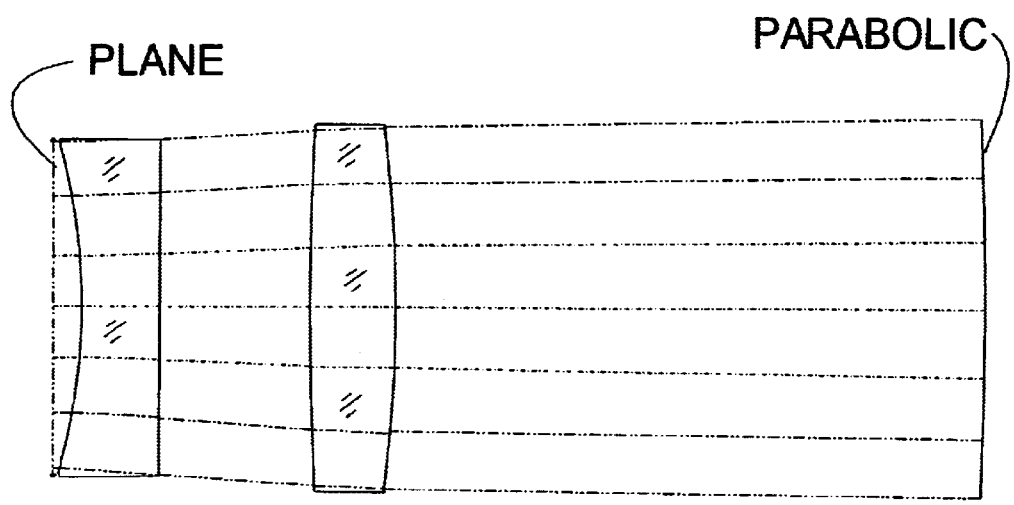
FIG. 4 is a diagrammatic elevational view of the same compensation system as in FIG. 3 used with wavelength $\lambda_2$=457.94 nm for producing a parabolic wavefront with a diameter of 139.8 mm at a distance of 165.1649 mm from the last lens surface with a plane wavefront of diameter 100 mm is entering from the left side.

The system is shown in FIGS. 3 and 4.

The data for the systems are given below. The two wavefronts produced are characterized here as MIRROR surfaces.

TABLE 2

System-Data for the system of the first example.

| Surf | Radius | Thickness | Glass | Diameter | Conic |
|---|---|---|---|---|---|
| 1 | −281.9148 | 30 | SFL57 | 100 | 0 |
| 2 | −2860.398 | 42 | — | 105.5478 | 0 |
| 3 | 2278.728 | 30 | SF2 | 117.2213 | 0 |
| Lambda = 0.676440 | | | | | |
| 4a | −572.4359 | 88.04383 | — | 120.95 | 0 |
| 5a | −1313.907 | | MIRROR | 129.8172 | 0 |
| Lambda = 0.457940 | | | | | |
| 4b | −572.4359 | 165.1649 | | 121.9814 | 0 |
| 5b | −1313.907 | | MIRROR | 139.6889 | −1 |

Since the produced wavefronts physically can never be "exactly" spherical or "exactly" parabolic, the concept of an $OPD_{design}(\lambda)$ was introduced before. For the sake of clarity, what was defined before is repeated here:

$OPD_{design}(\lambda_1)$ OPD-error from the ideal design target caused by the system with the use of wavelength $\lambda_1$. Note: the target for step 1 is a spherical wavefront, so $OPD_{design}(\lambda_1)$ describes the deviation of the design from an ideal sphere.

$OPD_{design}(\lambda_2)$ OPD-error from the ideal design target caused by the system with the use of wavelength $\lambda_2$. Note: the target for step 2 is a parabolic wavefront, so $OPD_{design}(\lambda_2)$ describes the deviation of the design from an ideal parabola.

Figure 5:
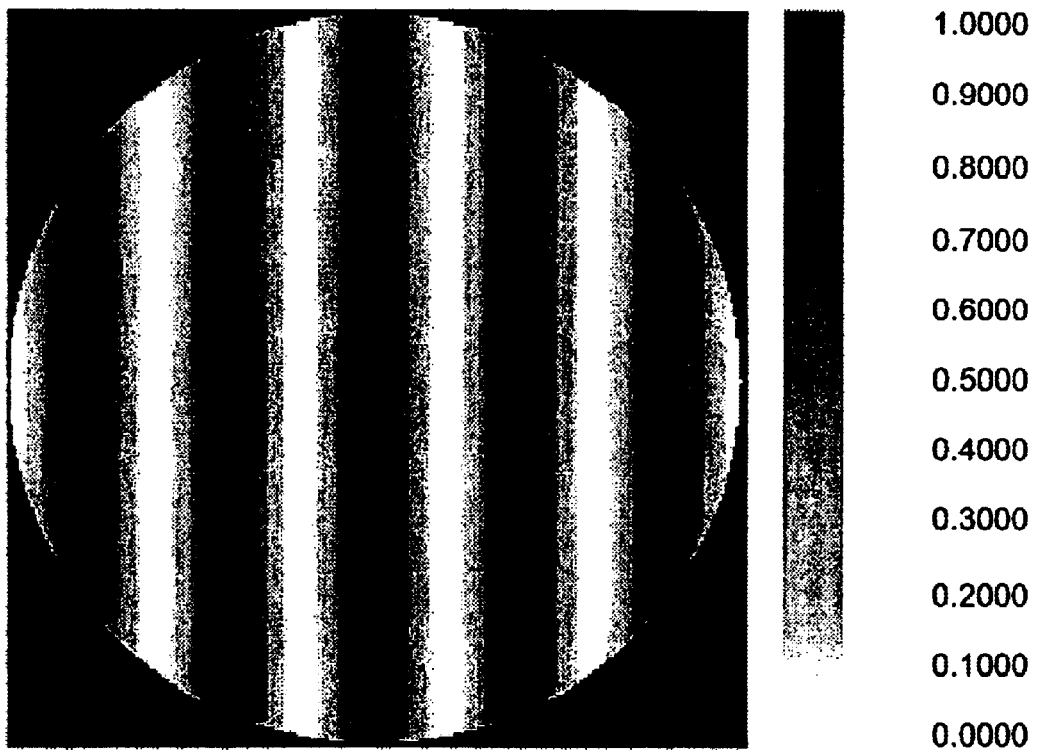
FIG. 5 is an interferogram between a reference beam and the arrangement of FIG. 3.
Figure 6:
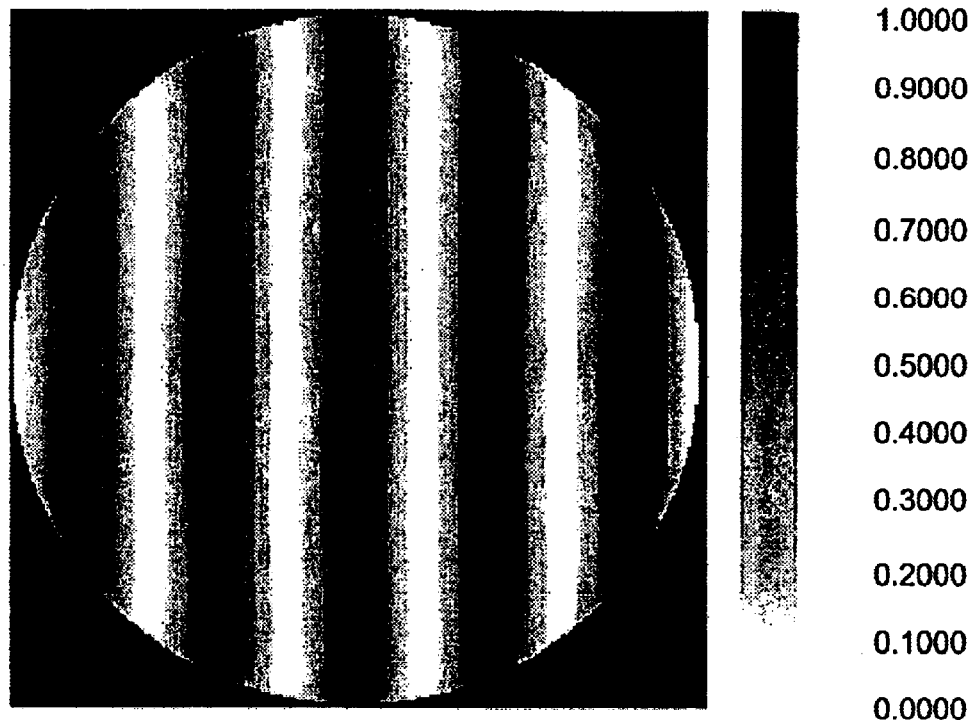
FIG. 6 is an interferogram between a reference beam and the arrangement of FIG. 4.

In the following FIGS. 5 and 6, the deviations of the wavefronts from the ideal shapes are shown in the form of interferograms, which will be well understood by those skilled in the art. For the presentation of the deviation with interference "fringes", one fringe equals an OPD-deviation of 1 $\lambda$ of the wavelength used in that specific case, i.e., 676.44 nm for the sphere and 457.94 nm for the parabola. Five "tilt" fringes are introduced in order to judge the "straightness" of the fringes. Note that in the design, the OPD was calculated for double pass of the system; therefore, the "scale factor" has to be set to 0.5 to show the OPD in single pass, which is done interferograms of FIGS. 5 and 6.

It will be obvious to those skilled in the art that the remaining errors are so extremely small that they will by no means deteriorate the quality of the interferometric measurements. In practice, it is not necessary to reach such a level of perfection in order to met the general design goal for very high precision fabrication of the compensation system to its design specifications. To use as few lenses as possible within the compensation system is the better choice compared to reducing the $OPD_{design}(\lambda_1)$ and $OPD_{design}(\lambda_2)$ to very small values. In contrast, if these values become very small, it is more likely that bugs will be introduced by introducing "sign-errors" or "factor two errors" because they are harder to be separated from the other errors discussed before.

Example 2

Figure 7:
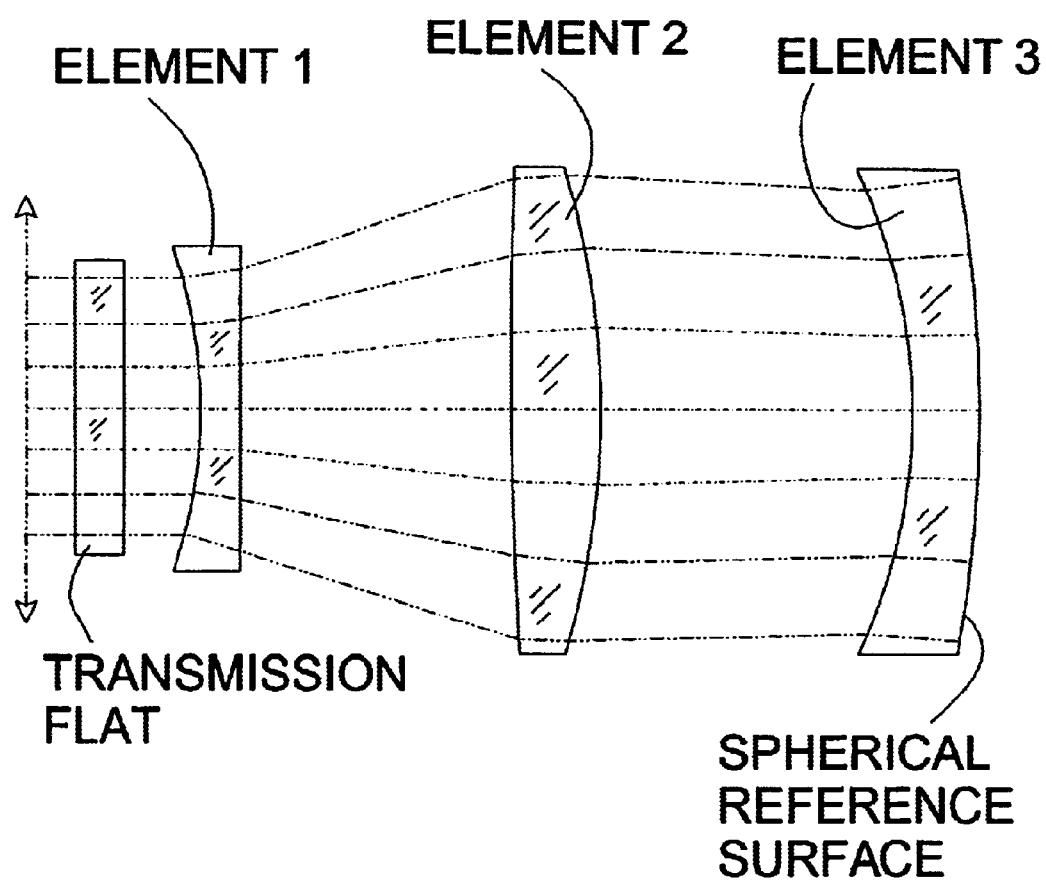
FIG. 7 is a diagrammatic elevational view of a three element compensation system containing a spherical reference surface at the last surface of the third lens. The plane parallel plate (before the three lens elements of the compensating system) acts as a reference surface for both configurations. The system produces a spherical wavefront (identical to the sphere of the last surface) when illuminated with a plane wave of wavelength $\lambda_1$=676.44 nm. The diameter of the plane wave entering the system is 100 mm, the diameter of the last surface is 200 mm, the radius of the last surface is −700 mm.
Figure 8:
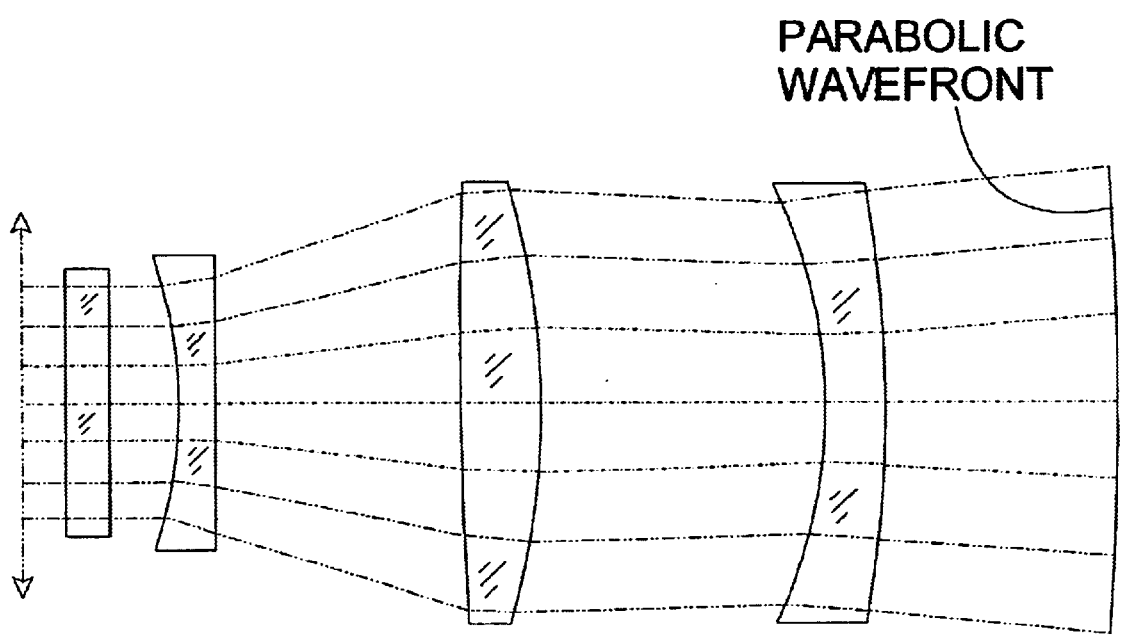
FIG. 8 is a diagrammatic elevational view of the three element compensation system of FIG. 7 used at wavelength $\lambda_2$=457.94 nm to produce a parabolic wavefront at a vertex distance of 83.2245 mm from the last surface and with a diameter of 224 mm. The vertex radius of the parabola is R0=−810 mm. The same plane parallel plate as before is drawn left of the system, and this acts as a transmission flat for the tests.
Figure 9:
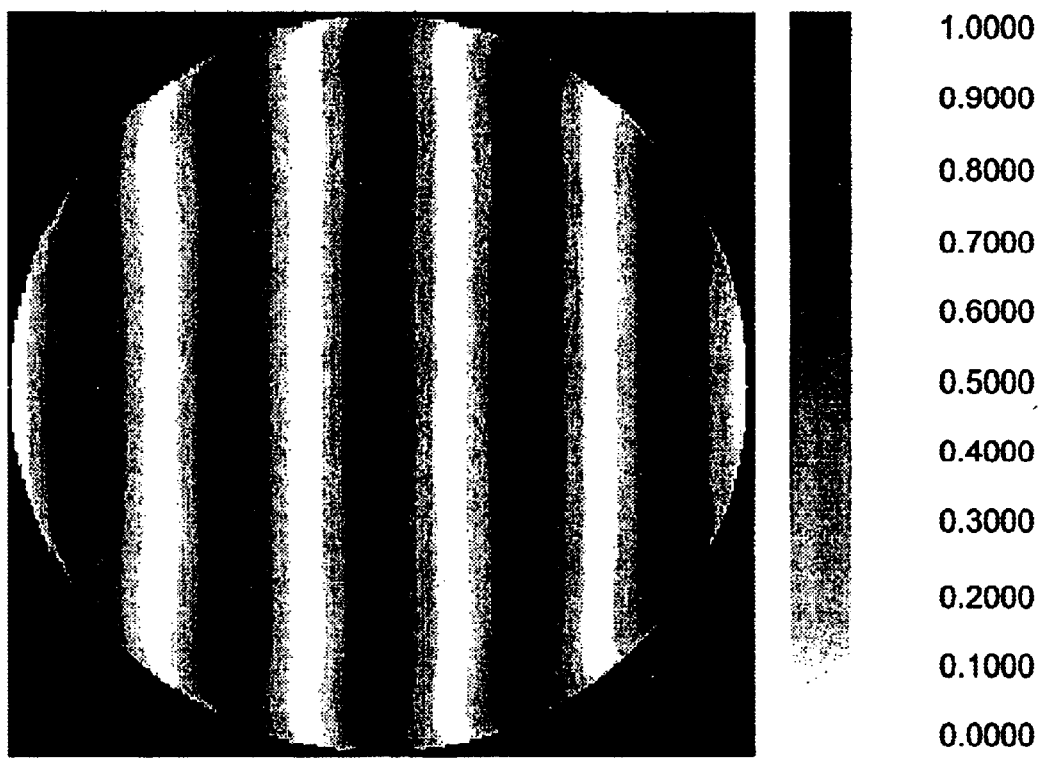
FIG. 9 is an interferogram showing the design error $OPD_{design}$ of the system of Example 2 for the calibration measurement with wavelength $\lambda_1$=676.44 nm (system of FIG. 7)
Figure 10:
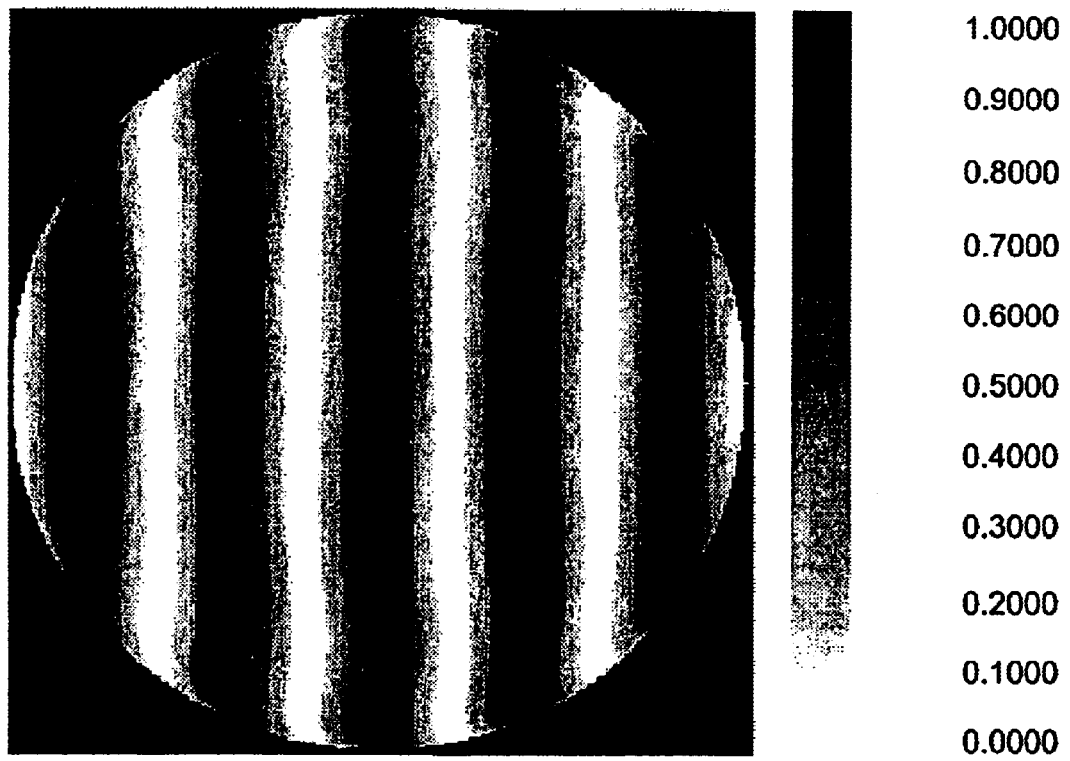
FIG. 10 is an interferogram showing the design error $OPD_{design}$ of the system of Example 2 for the measurement of the parabola at wavelength $\lambda_2$=457.94 nm (system of FIG. 8)

The optical lay out of example 2 is given in the FIGS. 7 and 8 and the resultant interferograms in FIGS. 9 and 10. It is a three lens system with lenses made of SCHOTT SF57, SF59 and F7. In these examples, practical considerations for the use of preferred glass types (e.g., price, homogeneity, ease of manufacture, index of refraction and expansion with temperature) are not taken into account. The last surface of the last lens is the spherical reference surface that is used for the calibration of the system. The surface errors of this surface, i.e. the deviation from exact sphericity must be measured in an extra set up where the lens is used as a conventional transmission sphere which is calibrated for the Fizeau surface. Methods exist to do such tests to very low uncertainty.

TABLE 3

System-Data for the system of the second example.

| Surf | Radius | Thickness | Glass | Diameter | Conic |
|---|---|---|---|---|---|
| 1 | −132.8121 | 20 | SF57 | 130 | 0 |
| 2 | −1047.486 | 126.1655 | | 130 | 0 |
| 3 | 1426.829 | 39 | SF59 | 210 | 0 |
| 4 | −372.2381 | 119.0539 | | 210 | 0 |
| 5 | −235.5368 | 35 | F7 | 210 | 0 |
| Lambda = 0.676440 | | | | | |
| 6a | −700 | 0 | | 210 | 0 |
| 7a | −700 | | MIRROR | 200 | 0 |
| Lambda = 0.457940 | | | | | |
| 6b | −700 | 83.2245 | | 210 | 0 |
| 7b | −810 | | MIRROR | 224 | −1 |

Figure 11:
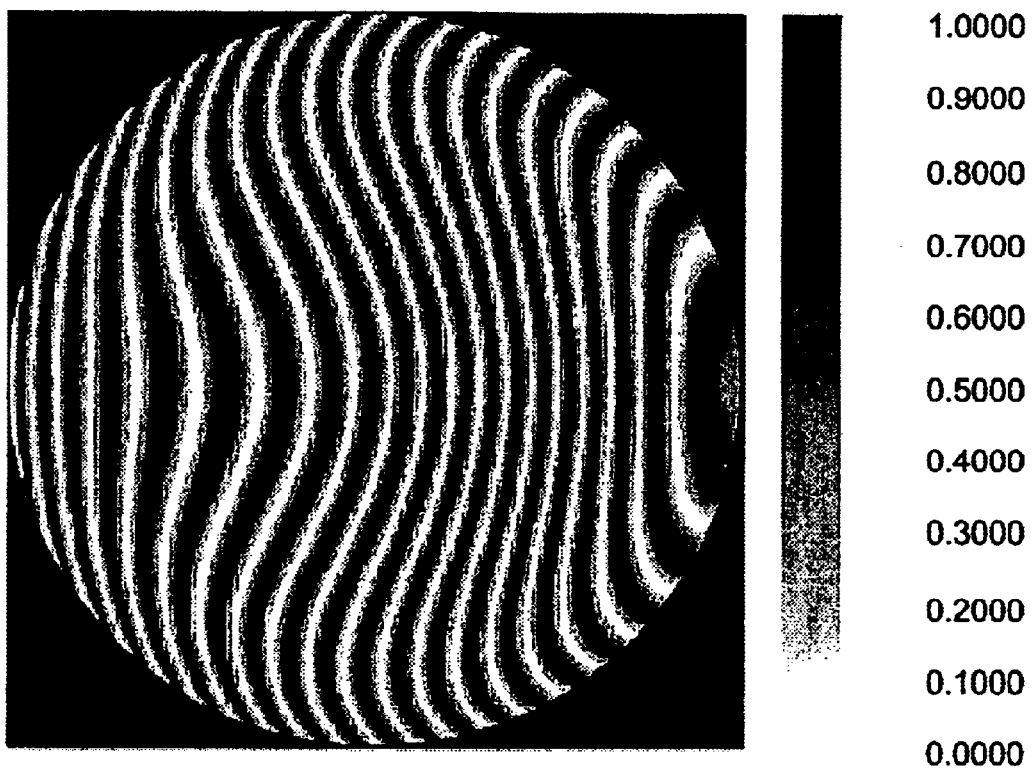
FIG. 11 is a pseudo interferogram in which the sensitivity of the display has been reduced by a factor of 10 and showing the aberrations induced by the use of the false wavelength.

For those skilled in the art, it will be very interesting to see how large the deviation between the spherical wavefront and the aspherical wavefront is. This is interesting for the question of whether it is possible to also design compensation systems for aspherical surfaces, which deviate remarkably from a sphere. In order to get this information, the wavefront was computed that will result, if the aspherical surface is tested with wavelength $\lambda_1$ instead with wavelength $\lambda_2$. In order to be able to show the resulting deviation, the sensitivity of the interferogram was reduced by a factor of 10. The "pseudo-interferogram" is shown in FIG. 11. Here, 20 tilt fringes are added to be able to show the deviation. For "best focus", setting the deviation is about 30 $\lambda_1=20$ $\mu$m in single pass. That value is sufficient for mild aspheres, but not sufficient for lithographic lenses. But, it must be recognized, that the diameter of the lenses in the compensation system are of the order of 100 mm, whereas the lenses tend to be about 250 mm diameter; the amount of asphericity will scale at least linearly with the diameter, and more lenses will offer the possibility to induce more aberrations. Also, if the wavelength differs more, the aberrations will be stronger.

Figure 12:
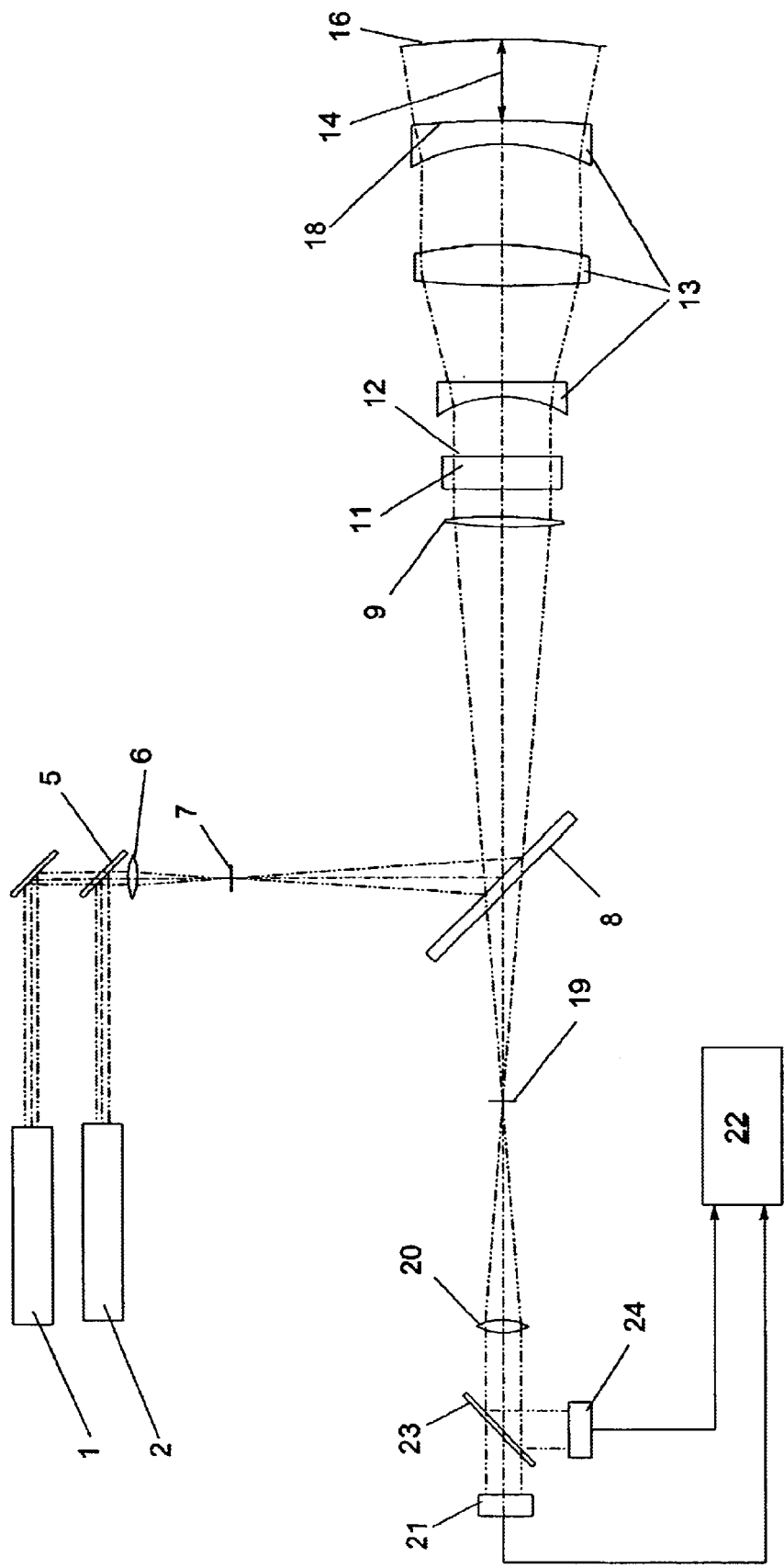
FIG. 12 is a diagrammatic elevational view of a preferred embodiment of the invention.

Reference is now made to FIG. 12 which shows a preferred embodiment. Here, the calibration step and the measuring step are performed simultaneously or quasi simultaneously.

The wavefront with wavelength $\lambda_2$ transits surface 18 and after the calculated vertex distance 14, the wavefront is reflected by the aspherical surface 16 to be tested. The compensation system 13 is designed according to the invention such that it produces with the wavelength $\lambda_2$ a wavefront that matches the aspherical surface to be tested as close as possible. The deviation between an exact match and the given match is known by optical ray-tracing and the design of the system and will be taken into account according to the method and equations described before. So, the auto-collimation condition is met for the aspherical surface 16 for the wavelength $\lambda_2$ again, and a plane wavefront with wavelength $\lambda_2$ leaves the system and can later interfere with the appropriate wavefront reflected from the surface 12 of the transmission flat 11.

The main part of the wavefront with wavelength $\lambda_1$ will transit surface 18 and will be reflected by the aspherical surface 16 too. This light does not produce a useful plane wave after it has passed through the system 13 and the transmission flat 11. In the focal plane of the collimator lens 9, this strongly aberrated wavefront does not produce a small focus spot, but instead produces a caustic region with a circle of least confusion somewhere, which might be rather big in diameter. Therefore, the main part of this false light is blocked by the aperture 19; only in the center of the beam there will be still some three beam interference. This false beam can be reduced to such a small fraction, that it is no longer of concern by using as, for example, the system disclosed in German Patent Application No. 10121516.9 filed on May 3, 2001 or other suitable method.

There are other methods applicable to overcome this problem by, for instance, sequentially measuring with both wavelengths and introducing a mechanical beam stop between surfaces 18 and 16 when the calibration measurement with wavelength $\lambda_1$ is applied (this can be a chopper-wheel, See 3 in FIG. 13), or the aspherical surface might be coated such, that $\lambda_1$ is not reflected. If the aspherical surface is coated for a wavelength which is appropriate for the later application of this lens, the wavelength $\lambda_1$ may be chosen such that the reflectivity is minimized for that wavelength. At the same time $\lambda_2$ can be chosen to give a good reflectivity. There will be other possibilities too, which are not mentioned here.

From the description, it should now be clear that for both wavelengths useful two-beam interference will take place at the same time. These two interferograms are separated by the dichroic beam splitter 23 behind lens 20, and then measured on two CCD-cameras simultaneously. Due to the additional reflection of the beamsplitter 23, the interferograms are mirrored on each other; this can be corrected later in the computer 22, where the measurement results for both interferograms are processed further according to the equations given before.

It should be mentioned, that phase shifting can be applied by moving the transmission flat 11 with PZT or other means; the phase steps will not be the same fraction of a wavelength for both wavelengths because the steps are equal, but the wavelength not. But, this is by no means a problem because, for both interferograms, different algorithms can be applied or an algorithm can be used, which is designed for both phase steps at the same time. Such algorithms are published by Kuechel for instance in M. Kuechel: "Some Progress in Phase Measurement Techniques", in W. Jueptner, W. Osten eds.: Fringe '97, Sep. 15–17, 1997, Akademie Verlag, ISBN 3-05-501791-9.

The advantage of the described technique is that, because a good amount of the disturbances and influences on the compensation system are common to both measurements which take place at the same time, they cancel in the result since the calibration measurement is essentially subtracted from the measurement at the part. This is especially true and valuable for gravity and temperature induced errors on the compensation system.

Figure 13:
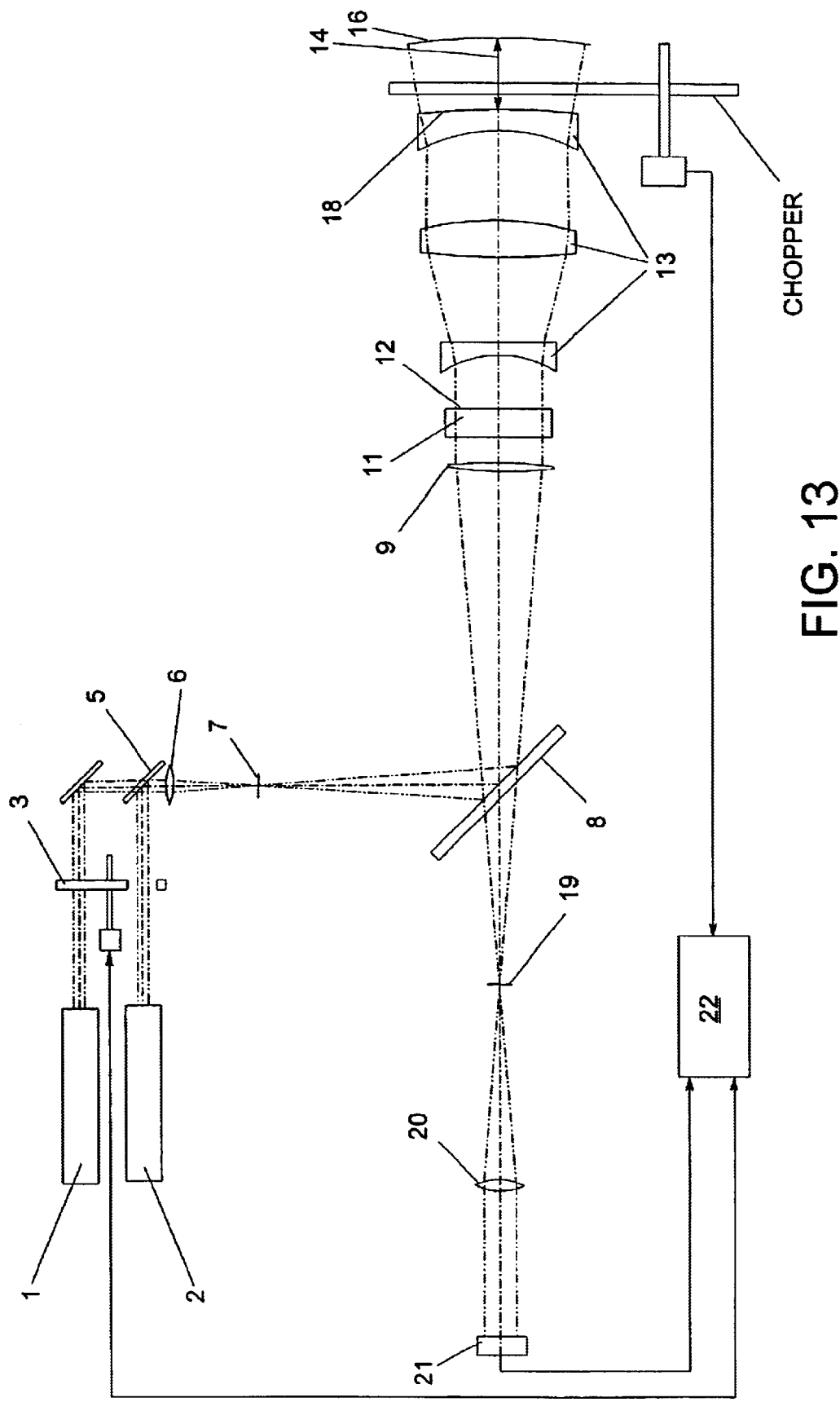
FIG. 13 is a diagrammatic elevational view showing the use of a chopper 3 at the light sources and a chopper between the compensation system and the aspheric surface synchronized with the CCD camera 21 by the computer 22.
Figure 14:
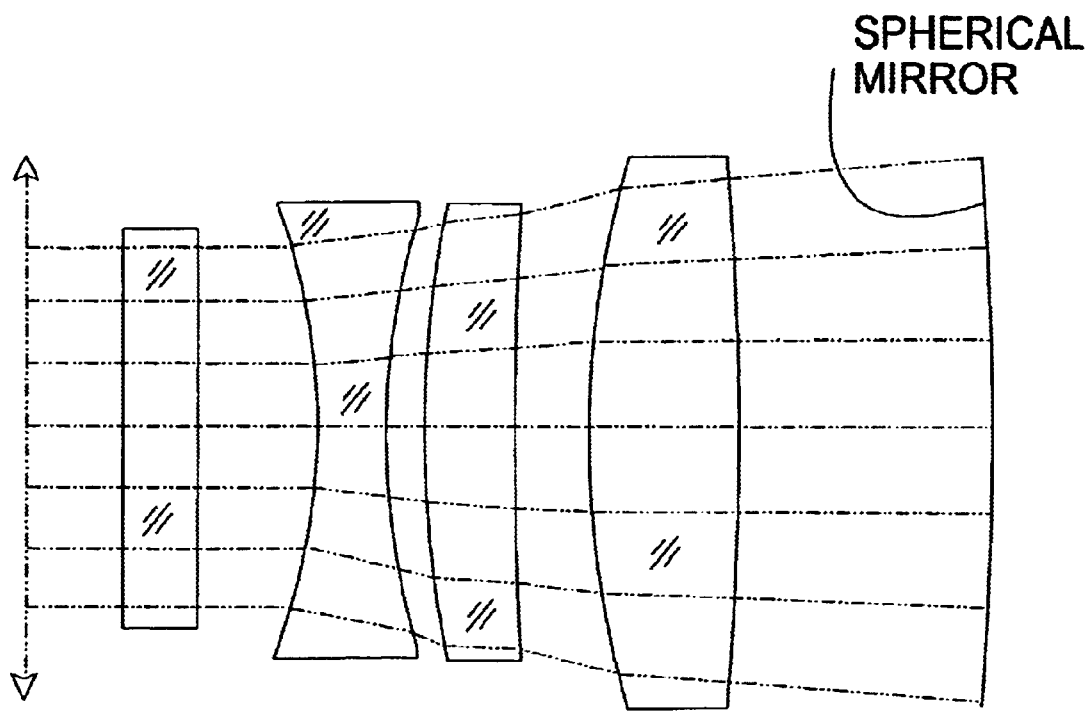
FIG. 14 is a diagrammatic elevational view showing an arrangement for calibration of a 3-lens compensation system (transmission asphere) with the help of a spherical mirror (this is the surface at the very right side)
Figure 15:
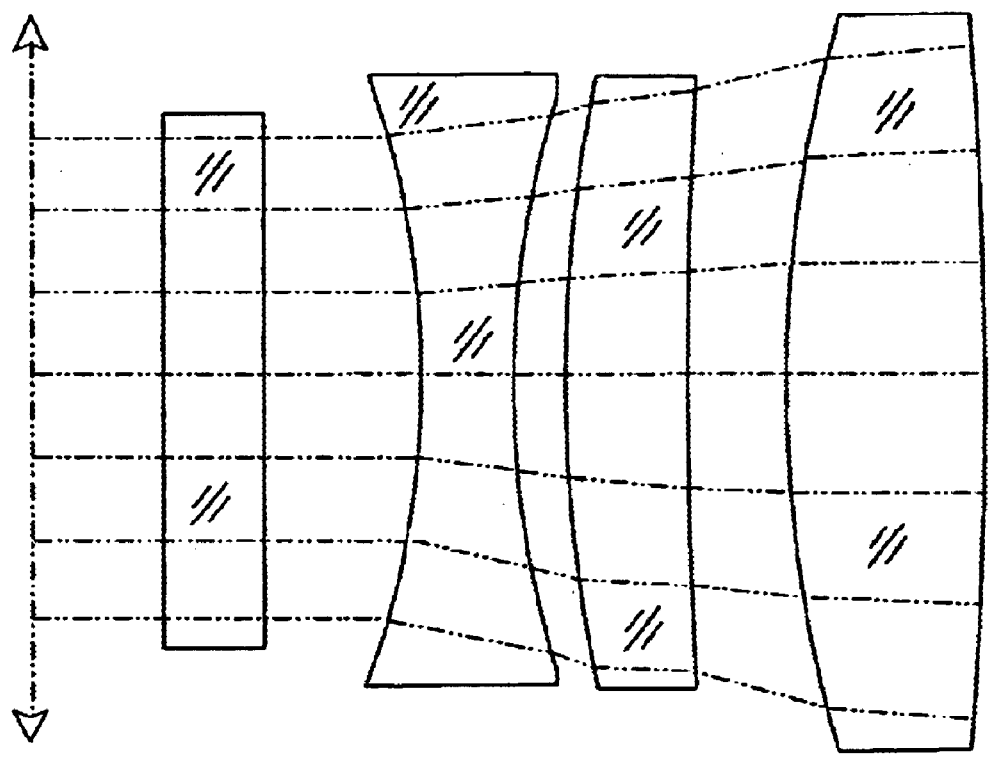
FIG. 15 is a diagrammatic elevational view showing use of the transmission asphere at wavelength $\lambda_2$=457.94 nm.

An alternative approach is shown in FIG. 13. Here only one CCD-camera is used and the light sources are used sequentially. In that case, an additional chopper between the surface to be tested and the compensation system can be introduced to prevent three-beam interference in the center of the interferogram. The prescription data of the lenses for the third example are given in the following Table 4. In the third example, the compensation system contains an aspherical lens surface at the last surface of the system, i.e., is a transmissive asphere as described, for example, in U.S. Provisional Patent Application No. 60/299,512 filed on Jun. 20, 2001, now U.S. patent application Ser. No. 10/152,075 filed on May 21, 2002 and incorporated herein by reference. This is a reversal of Example 2.

TABLE 4

System-Data for the system of the third example.

| Surf | Radius | Thickness | Glass | Diameter | Conic |
|---|---|---|---|---|---|
| 1 | −144.0154 | 20.5 | SK11 | 150 | 0 |
| 2 | 182.143 | 10.62856 | | 140 | 0 |
| 3 | 299.6257 | 32.2 | SFL57 | 150 | 0 |
| 4 | 739.8508 | 13.57485 | | 150 | 0 |
| 5 | 282.4919 | 48.1 | KF9 | 180 | 0 |
| Lambda = 0.676440 μm | | | | | |
| 6a | −700 | 0 | | 180 | −1 |
| 7a | −700 | 0 | MIRROR | 160.187 | −1 |
| Lambda = 0.457940 μm | | | | | |
| 6b | −700 | 64.189 | | 180 | −1 |
| 7b | −750 | | MIRROR | 174.8873 | 0 |

Figure 16:
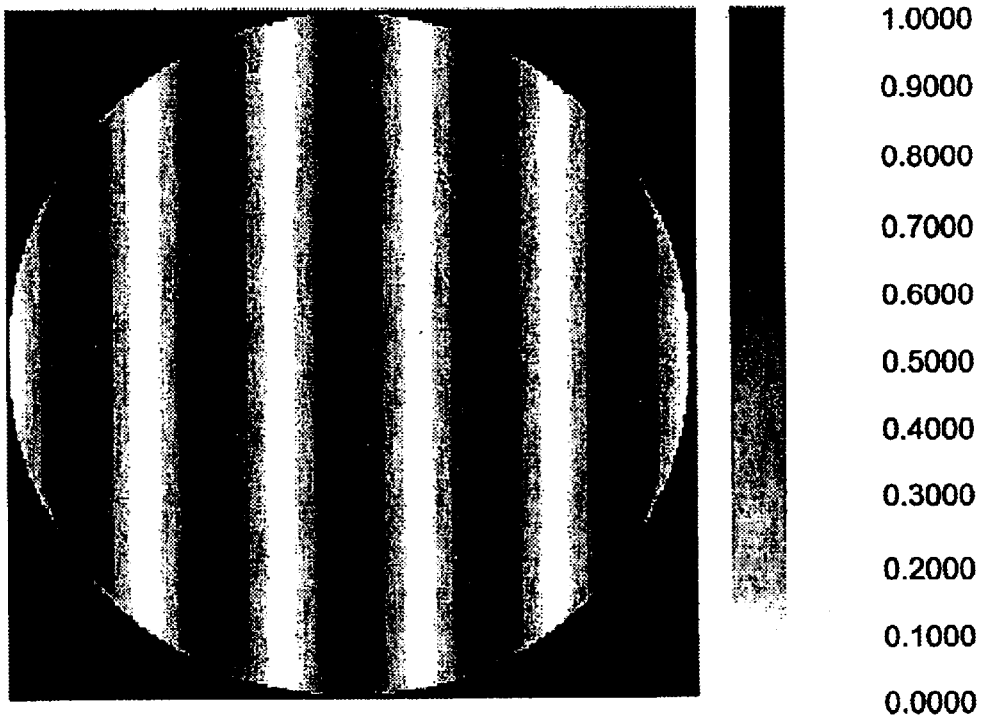
FIG. 16 is an interferogram showing the results of a calibration measurement with the help of the spherical mirror of FIG. 14: wavelength used was $\lambda_1$=457.94 nm.
Figure 17:
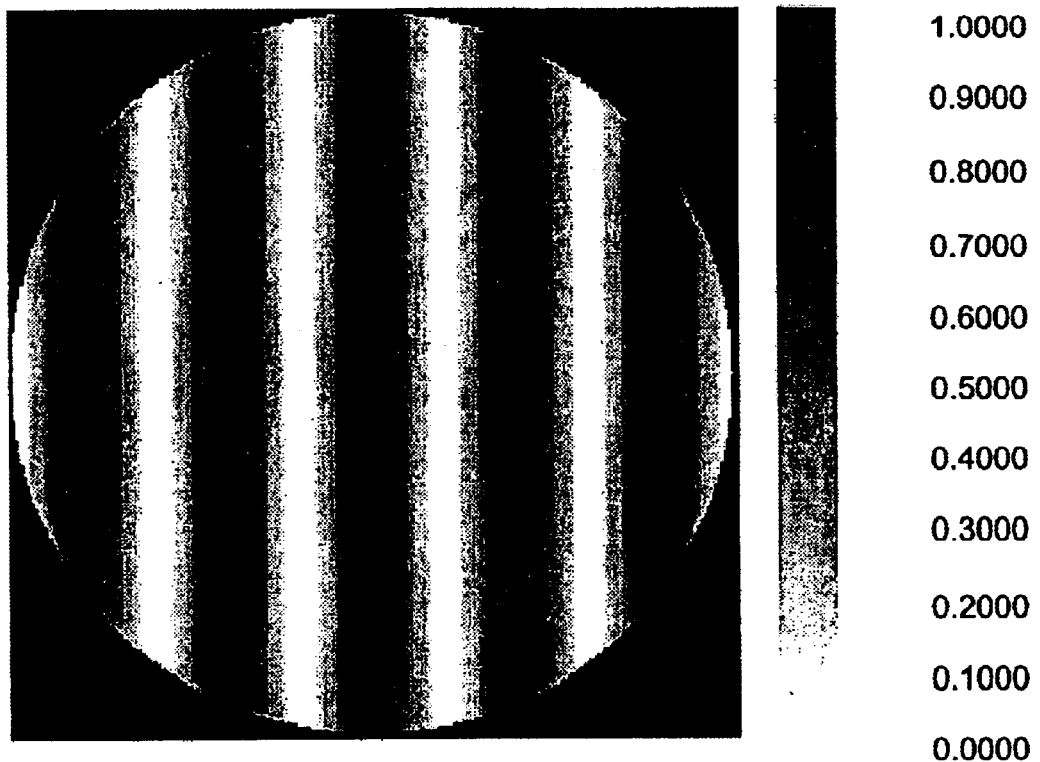
FIG. 17 is an interferogram showing the results of measurement of the compensation system (transmission-asphere of FIG. 14), when the wavefront is reflected at the last surface of the system when the wavelength used was $\lambda_2$=676.44 nm.

The interferograms are again very good. They are given in FIGS. 16 and 17.

Modifications of the invention will occur to those skilled in the art based on its teachings and embodiments described hereinabove, and such modifications are intended to be within the scope of the claimed invention.

What is claimed is:

1. A method for measuring aspheric surfaces and wavefronts with the use of an interferometer; said method comprising the steps of:

directing a spherical wavefront of known design at a wavelength $\lambda_1$ at a reference sphere with known measured surface properties to generate a first electronic signal containing information about the optical path differences between the reference and measurement wavefronts generated by the interferometer;

directing an apherical wavefront of known design at a wavelength $\lambda_2$ at an aspherical surface or wavefront to be tested to generate a second electronic signal containing information about the optical path differences between the reference and measurement wavefronts generated by the interferometer analyzing said first and second electronic signals and calculating therefrom wavefront error maps $W_1=W_1(\lambda_1)$ and $W_2=W_2(\lambda_2)$ both of which contain wavelength dependent known design and measured errors and unknown errors due to the manufacture, material composition of components in the interferometer, and systematic errors; and determining the optical path error caused by shape errors in the aspherical surface or wavefront while accounting for substantially all error sources present in the electronic signals.

2. The method of claim 1 wherein the optical path length error caused by shape errors in the aspherical surface or wavefront is of the form:

$$A = \frac{W_1 - W_2}{2} - [(Known\ Errors = f(\lambda_1, \lambda_2)) +$$

$$(Unknown\ Errors = f(\lambda_1, \lambda_2))]$$

3. The method of claim 2 further including the step of determining the Known Errors in the surface shapes and materials of the interferometer components by one of measurement and calculation procedures.

4. The method of claim 3 further including the step of reducing the Unknown Errors to the form:

$opd_{manufacturingerror}(\lambda_2 - \lambda_1)$;

estimating $opd_{manufacturingerror}$; and calculating the final error A using the determined values for $[(Known\ Errors=f_1,\lambda_2))+(Unknown\ Errors=f(\lambda_1, \lambda_2))]$.

5. The method of claim 2 wherein A is of the form:

$$A = \frac{W_2 - W_1}{2} - [OPD_{design}(\lambda_2) - OPD_{design}(\lambda_1)] + S -$$

$$[OPD_{manufacturingerror}(\lambda_2) - OPD_{manufacturingerror}(\lambda_1)] - \frac{1}{2}(M_2 - M_1),$$

where $OPD_{design}(\lambda_1)$ is the OPD-error from the ideal design target caused by a compensating lens with the use of wavelength $\lambda_1$, the target being a spherical wavefront, so $OPD_{design}(\lambda_1)$ describes the deviation of the design from that target, $OPD_{design}(\lambda_2)$ is the OPD-error from the ideal design target caused by the compensating lens with the use of wavelength $\lambda_2$, the target being the aspherical wavefront equal to the aspherical surface to be tested, so $OPD_{design}(\lambda_2)$ describes the deviation of the design from that ideal target, $OPD_{manufacturingerror}(\lambda_1)$ is the OPD-error caused by the compensating lens when wavelength $\lambda_1$ is used, $OPD_{manufacturingerror}(\lambda_2)$ is the OPD-error caused by the compensating lens when wavelength $\lambda_2$ is used, S is the OPD-error caused by the Known Errors of the deviation of the reference sphere, $M_1, M_2$ are random OPD-errors in measurements and have no bias with a statistical expectation value of zero.

6. The method of claim 5 wherein the manufacturing error at $\lambda_1$ is given by:

$$OPD_{manufacturingerror}(\lambda_1) = \frac{W_1}{2} - OPD_{design}(\lambda_1) - S - F - \frac{M_1}{2}.$$

7. The method of claim 6 further including the step of calculating the value of $OPD_{manufacturingerror}(\lambda_1)$ and refiguring components of the interferometer to compensate for errors due to manufacturing.

8. The method of claim 5 wherein $[OPD_{manufacturingerror}(\lambda_2)-OPD_{manufacturingerror}(\lambda_1)]$ is represented by a Taylor series expansion in which a first part is known and a second part which describes the change in manufacturing errors with wavelength.

9. The method of claim 8 wherein said second part is much smaller than said first part when multiplied by $(\lambda_2-\lambda_1)$ and is smaller by a factor between 30 and 100.

10. The method of claim 8 wherein $OPD_{manufacturingerror}(\lambda_2)$ expressed as a Taylor series expansion is represented by:

$OPD_{manufacturingerror}(\lambda_2) =$ $OPD_{manufacturingerror}(\lambda_1) + \frac{\partial}{\partial \lambda} OPD_{manufacturingerror}(\lambda_1) \cdot (\lambda_2 - \lambda_1) + \cdots =$ $OPD_{manufacturingerror}(\lambda_1) + opd_{manufacturingerror}(\lambda_1) \cdot (\lambda_2 - \lambda_1) + \cdots$.

11. The method of claim 10 wherein the bracketed term, $[OPD_{manufacturingerror}(\lambda_2)-OPD_{manufacturingerror}(\lambda_1)]$, appearing in claim 5 reduces to $opd_{manufacturingerror}(\lambda_2-\lambda_1)$ when $OPD_{manufacturingerror}(\lambda_2)$ is replaced by said Taylor series expansion.

12. The method of claim 11 wherein $opd_{manufacturingerror}(\lambda_2-\lambda_1)$ is composed of surface errors on the lenses and inhomogenity errors in glass components of the interferometer.

13. The method of claim 12 wherein the surface and inhomogeniety errors of a compensating lens in the interferometer are estimated based on the indices of refraction and dispersion properties of its glass composition.

14. The method of claim 1 wherein the spherical and aspherical wavefronts are generated by directing a collimated beam through a compensating lens at $\lambda_1$ and $\lambda_2$ at different times.

15. The method of claim 14 wherein said aspherical wavefront is nominally identical to the aspheric surface or wavefront to be measured.

16. The method of claim 1 wherein the precision by which said aspheric surface or wavefront can be measured is a fraction of a nanometer.

17. The method of claim 1 carried out using a common path interferometer.

18. The method of claim 17 wherein said common path interferometer is a Fizeau in form.

19. Interferometric apparatus for measuring aspheric surfaces and wavefronts; said apparatus comprising:

an interferometer having reference and measurement legs;

means positioned along said measurement leg for providing a support for alternately holding a reference sphere and an aspheric surface or means for generating an aspheric wavefront;

means for directing an aspherical wavefront of known design at a wavelength $\lambda_1$ at a reference sphere with known measured surface properties to generate a first electronic signal containing information about the optical path differences between the reference and measurement wavefronts generated by said interferometer and for directing an apherical wavefront of known design at a wavelength $\lambda_2$ at an aspherical surface or wavefront to be tested to generate a second electronic signal containing information about the optical path differences between the reference and measurement wavefronts generated by said interferometer; and means for analyzing said first and second electronic signals and calculating therefrom wavefront error maps $W_1=W_1(\lambda_1)$ and $W_2=W_2(\lambda_2)$ both of which contain wavelength dependent known design and measured errors and unknown errors due to the manufacture, material composition of components in the interferometer, and systematic errors and determining the optical path error caused by shape errors in the aspherical surface or wavefront while accounting for substantially all error sources present in said electronic signals.

20. The interferometric apparatus of claim 19 wherein the optical path length error caused by shape errors in the aspherical surface or wavefront is of the form:

$$A = \frac{W_1 - W_2}{2} - [(\text{Known Errors} = f(\lambda_1, \lambda_2)) + (\text{Unknown Errors} = f(\lambda_1, \lambda_2))]$$

21. The interferometric apparatus of claim 20 further including means for determining the Known Errors in the surface shapes and materials of the interferometer components by measurement and calculation.

22. The interferometric apparatus of claim 21 further including means for reducing the Unknown Errors to the form:

$\text{opd}_{manufacturingerror}(\lambda_2 - \lambda_1)$;

estimating $\text{opd}_{manufacturingerror}$; and calculating the final error A using the determined values for $[(\text{Known Errors} = f(\lambda_1, \lambda_2)) + (\text{Unknown Errors} = f(\lambda_1, \lambda_2))]$.

23. The interferometric apparatus of claim 2 wherein A is of the form:

$$A = \frac{W_2 - W_1}{2} - [OPD_{design}(\lambda_2) - OPD_{design}(\lambda_1)] + S - [OPD_{manufacturingerror}(\lambda_2) - OPD_{manufacturingerror}(\lambda_1)] - \frac{1}{2}(M_2 - M_1),$$

where $OPD_{design}(\lambda_1)$ is the OPD-error from the ideal design target caused by a compensating lens with the use of wavelength $\lambda_1$, the target being a spherical wavefront, so $OPD_{design}(\lambda_1)$ describes the deviation of the design from that target, $OPD_{design}(\lambda_2)$ is the OPD-error from the ideal design target caused by the compensating lens with the use of wavelength $\lambda_2$, the target being the aspherical wavefront equal to the aspherical surface to be tested, so $OPD_{design}(\lambda_2)$ describes the deviation of the design from that ideal target, $OPD_{manufacturingerror}(\lambda_1)$ is the OPD-error caused by the compensating lens when wavelength $\lambda_1$ is used, $OPD_{manufacturingerror}(\lambda_2)$ is the OPD-error caused by the compensating lens when wavelength $\lambda_2$ is used, S is the OPD-error caused by the Known Errors of the deviation of the reference sphere, $M_1, M_2$ are random OPD-errors in measurements and have no bias with a statistical expectation value of zero.

24. The interferometric apparatus of claim 23 wherein the manufacturing error at $\lambda_1$ is given by:

$$OPD_{manufacturingerror}(\lambda_1) = \frac{W_1}{2} - OPD_{design}(\lambda_1) - S - F - \frac{M_1}{2}.$$

25. The interferometric apparatus of claim 24 further including means for calculating the value of $OPD_{manufacturingerror}(\lambda_1)$ to compensate for errors due to manufacturing.

26. The interferometric apparatus of claim 23 wherein $[OPD_{manufacturingerror}(\lambda_2) - OPD_{manufacturingerror}(\lambda_1)]$ is represented by a Taylor series expansion in which a first part is known and a second part which describes the change in manufacturing errors with wavelength.

27. The interferometric apparatus of claim 26 wherein said second part is much smaller than said first part when multiplied by $(\lambda_2 - \lambda_1)$ and is smaller by a factor between 30 and 100.

28. The interferometric apparatus of claim 26 wherein $OPD_{manufacturingerror}(\lambda_2)$ expressed as a Taylor series expansion is represented by:

$$OPD_{manufacturingerror}(\lambda_2) = OPD_{manufacturingerror}(\lambda_1) + \frac{\partial}{\partial \lambda} OPD_{manufacturingerror}(\lambda_1) \cdot (\lambda_2 - \lambda_1) + \cdots = OPD_{manufacturingerror}(\lambda_1) + opd_{manufacturingerror}(\lambda_1) \cdot (\lambda_2 - \lambda_1) + \cdots .$$

29. The interferometric apparatus of claim 28 wherein the bracketed term, $[OPD_{manufacturingerror}(\lambda_2) - OPD_{manufacturingerror}(\lambda_1)]$, appearing in claim 23 reduces to $opd_{manufacturingerror}(\lambda_2 - \lambda_1)$ when $OPD_{manufacturingerror}(\lambda_2)$ is replaced by said Taylor series expansion.

30. The interferometric apparatus of claim 24 wherein $opd_{manufacturingerror}(\lambda_2 - \lambda_1)$ is composed of surface errors on the lenses and inhomogenity errors in glass components of said interferometer.

31. The interferometric apparatus of claim 30 wherein said surface and inhomogeniety errors are those of a compensating lens in the interferometer and are estimated based on the indices of refraction and dispersion properties of its glass composition.

32. The interferometric apparatus of claim 19 including means directing a collimated beam through a compensating lens at $\lambda_1$ and $\lambda_2$ at different times to generate the spherical and aspherical wavefronts.

33. The interferometric apparatus of claim 32 wherein said aspherical wavefront is nominally identical to the aspheric surface or wavefront to be measured.

34. The interferometric apparatus of claim 19 wherein the precision by which said aspheric surface or wavefront can be measured is a fraction of a nanometer.

35. The interferometric apparatus of claim 19 wherein said interferometer comprises a common path interferometer.

36. The interferometric apparatus of claim 35 wherein said common path interferometer is a Fizeau in form.

* * * * *